Jan. 11, 1955

G. P. HERRICK 2,699,299

CONVERTIBLE AIRCRAFT

Filed Aug. 11, 1948

INVENTOR.
Gerard P. Herrick
BY William C. Conner
His attorney

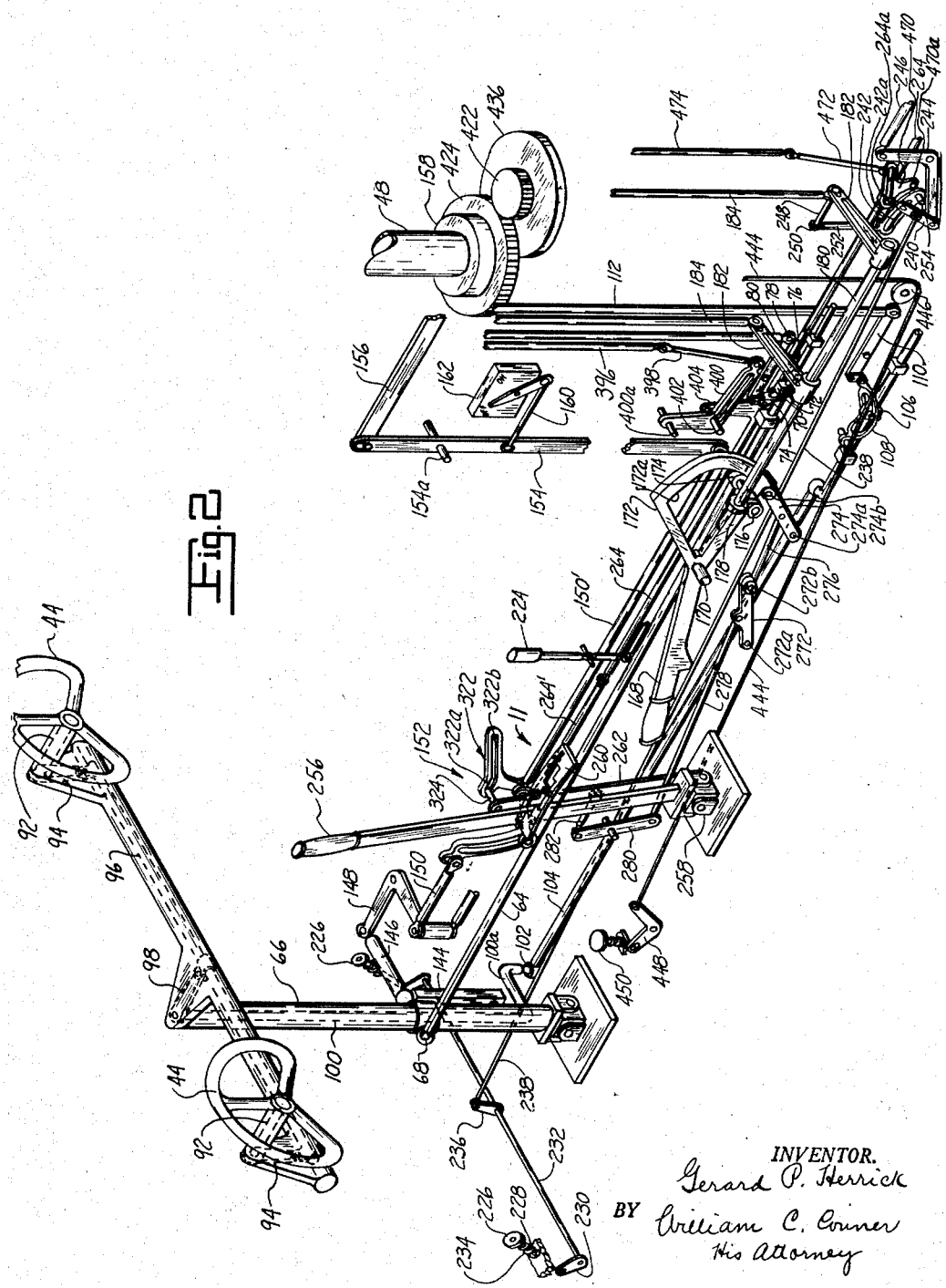

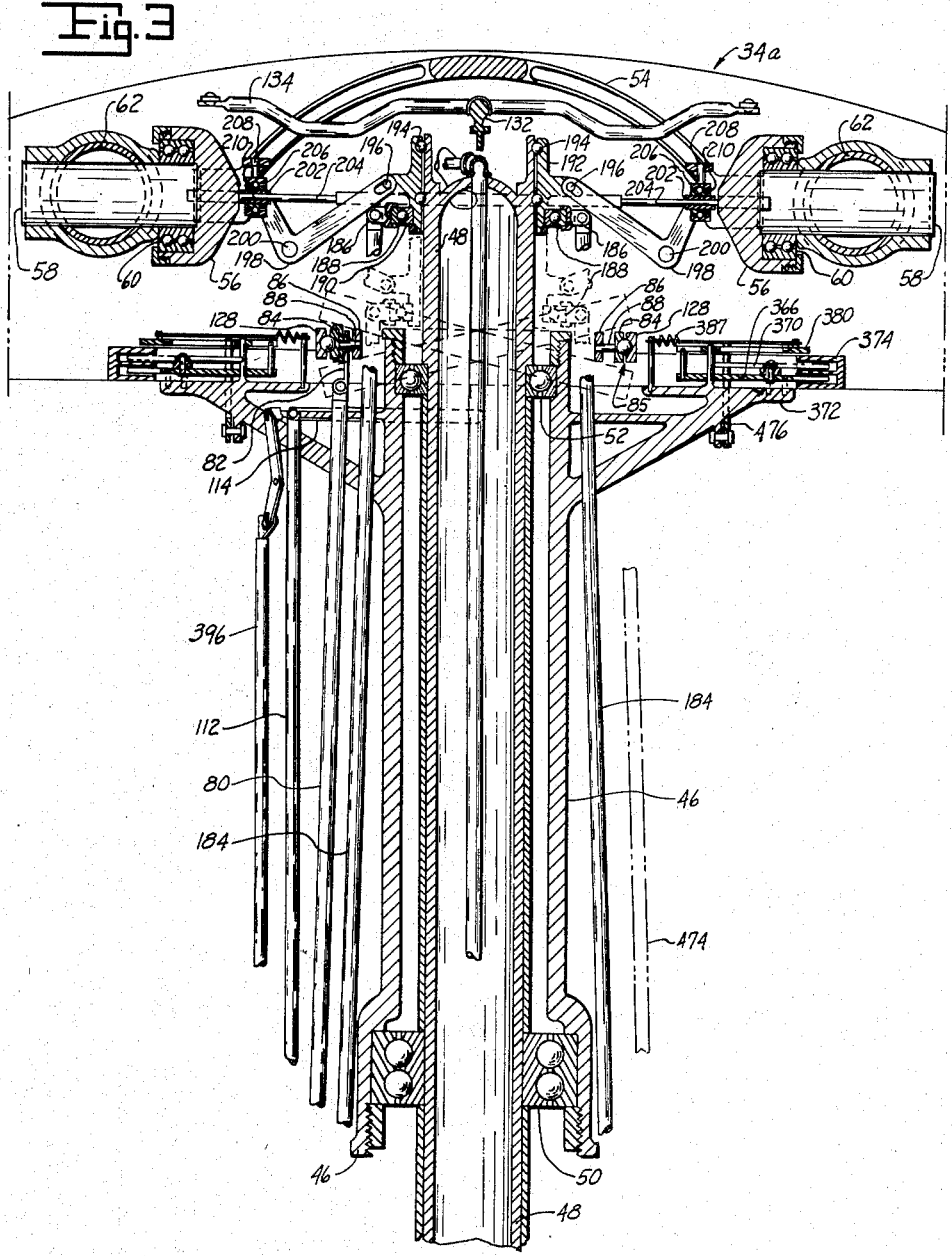

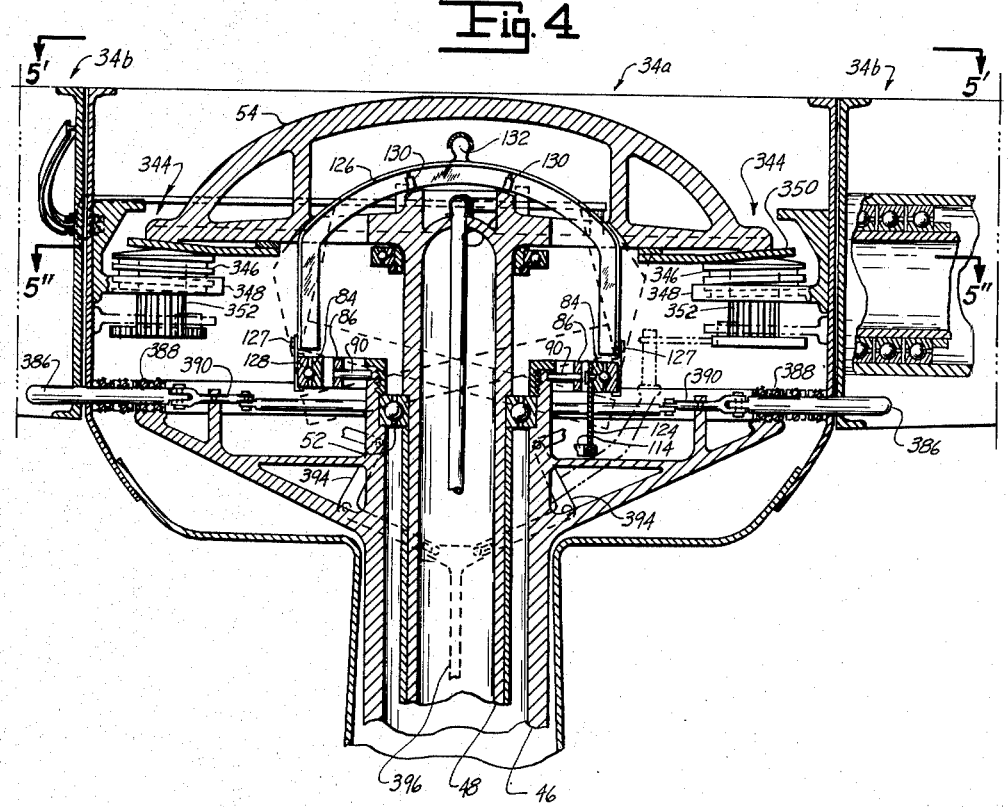

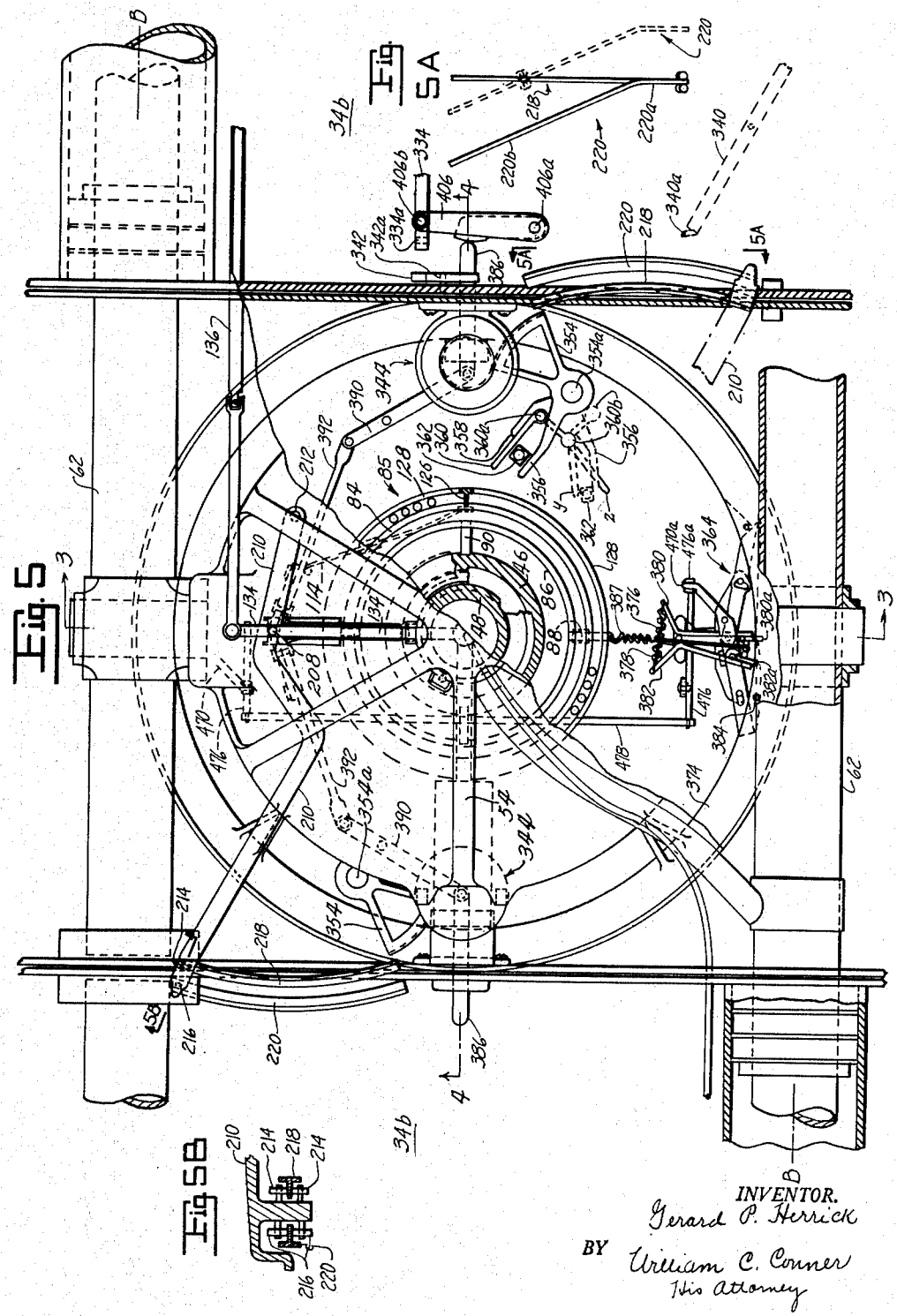

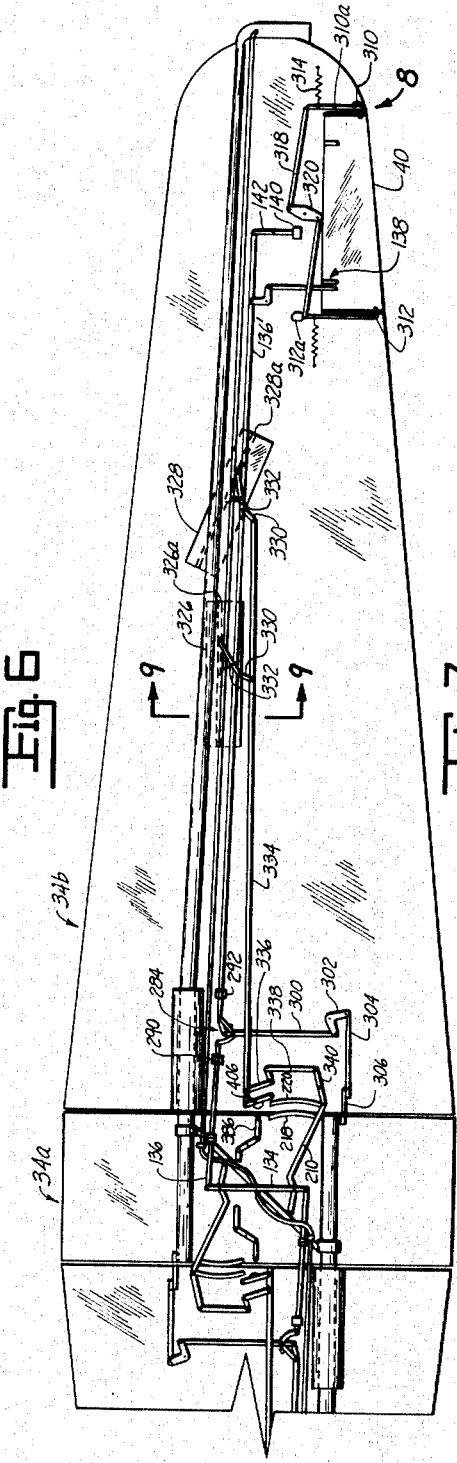

Jan. 11, 1955  G. P. HERRICK  2,699,299
CONVERTIBLE AIRCRAFT
Filed Aug. 11, 1948  9 Sheets-Sheet 7
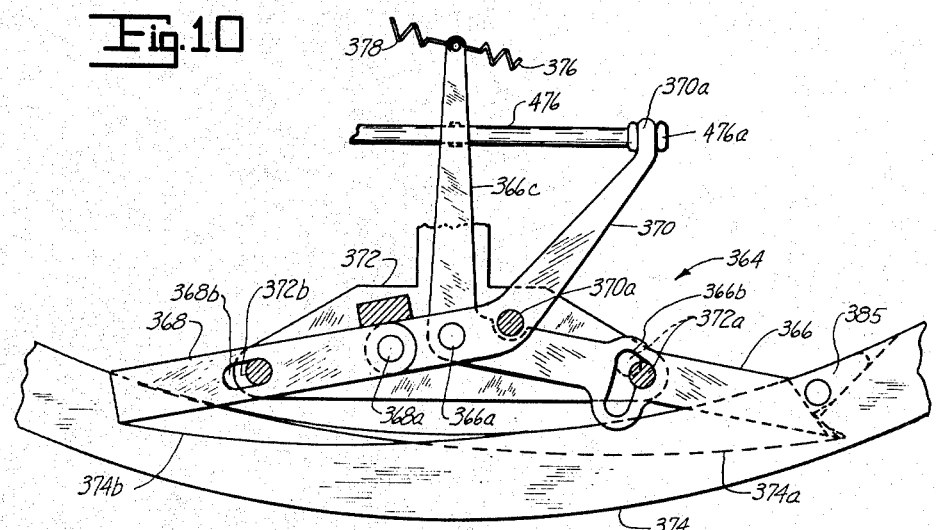
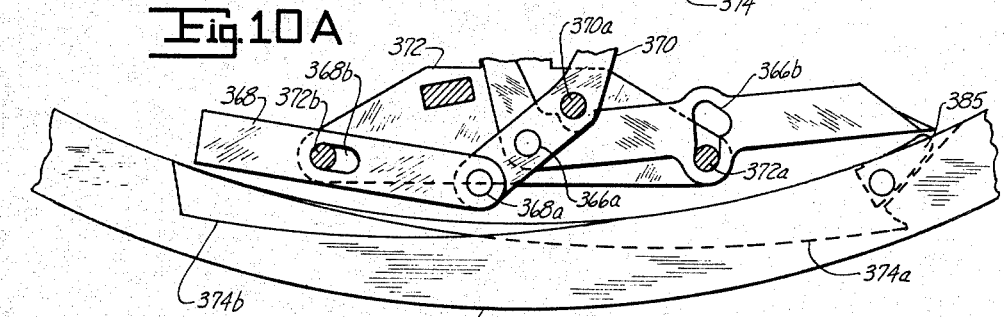
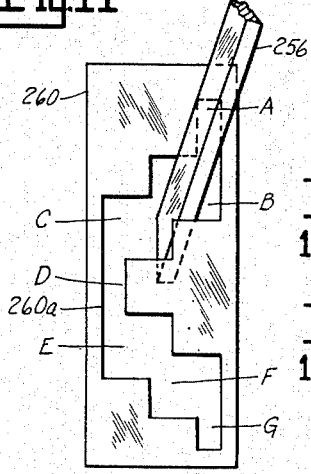
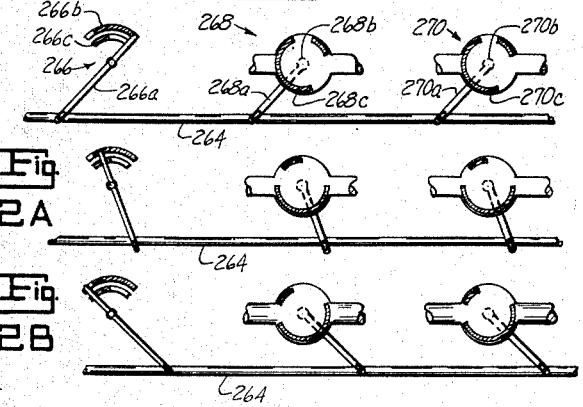
INVENTOR.
Gerard P. Herrick
BY William C. Conner
His Attorney Jan. 11, 1955
G. P. HERRICK
2,699,299
CONVERTIBLE AIRCRAFT
Filed Aug. 11, 1948
9 Sheets-Sheet 8
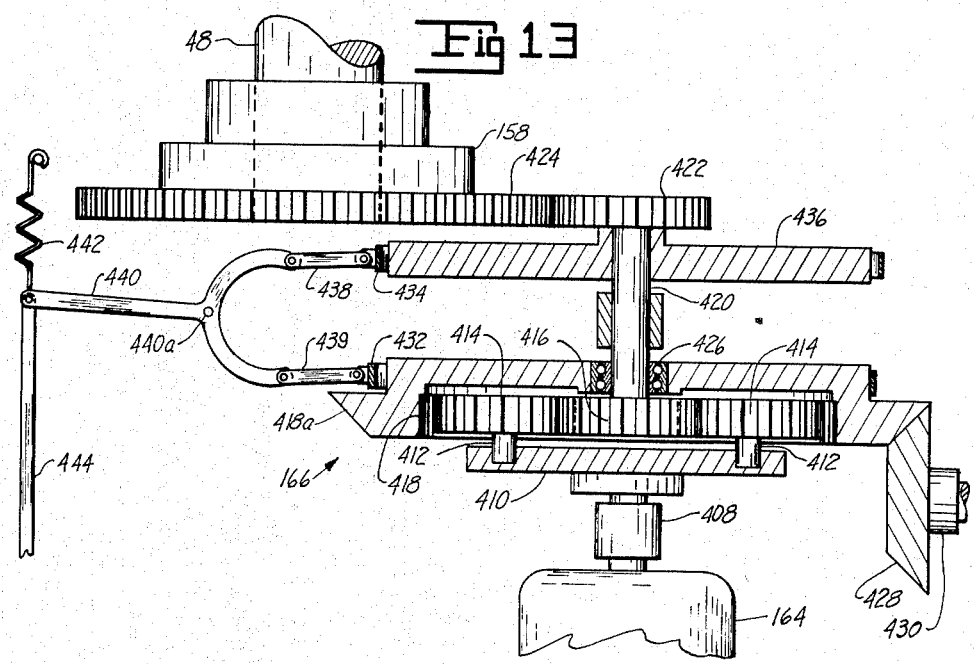
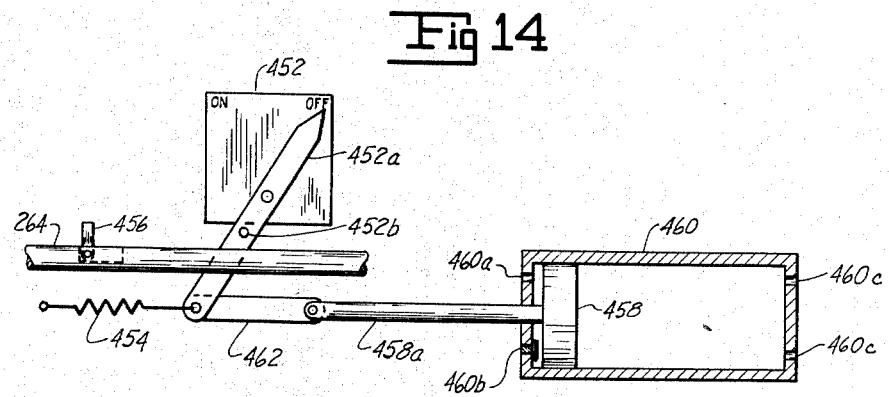
INVENTOR.
Gerard P. Herrick
BY William C. Conner
His Attorney Jan. 11, 1955
G. P. HERRICK
2,699,299
CONVERTIBLE AIRCRAFT
Filed Aug. 11, 1948
9 Sheets-Sheet 9
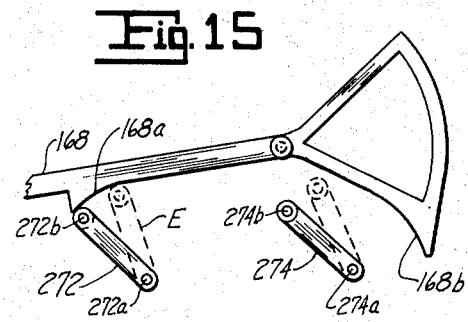
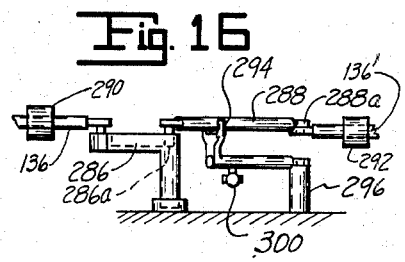
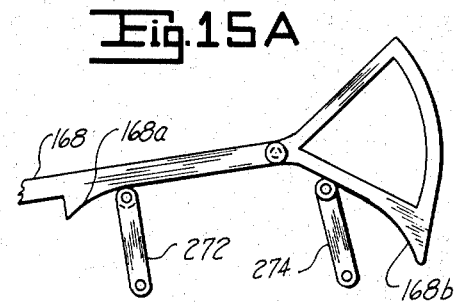
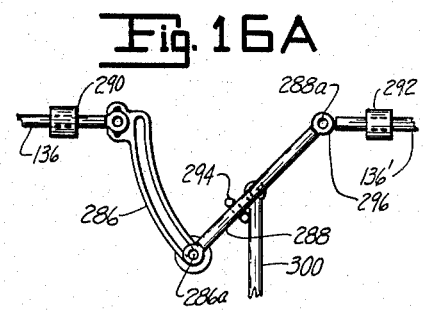
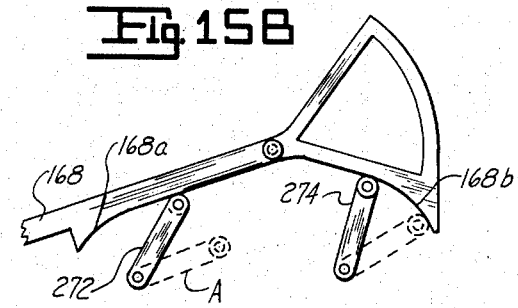
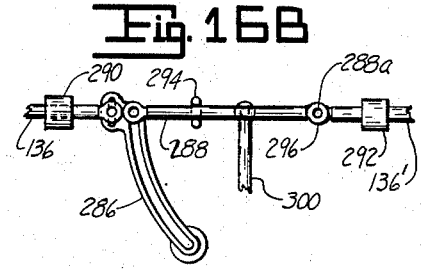
INVENTOR.
Gerard P. Herrick
BY William C. Conner
His attorney

United States Patent Office 2,699,299
Patented Jan. 11, 1955

2,699,299

CONVERTIBLE AIRCRAFT

Gerard P. Herrick, New York, N. Y.

Application August 11, 1948, Serial No. 43,729

14 Claims. (Cl. 244—7)

This invention relates to aircraft of the type convertible to either fixed- or rotary-wing flight, and particularly to improvements in mechanisms for controlling the same.

The aircraft described herein is of the general type disclosed in the co-pending application of Gerard P. Herrick, Ser. No. 596,986, filed June 1, 1945, now Patent No. 2,518,007, August 8, 1950. Such aircraft are capable of flying either as a helicopter and/or as an autogiro in addition to flying as an airplane, and of converting from one type of flight to the other in the air. It is among the objects of the present invention to provide an aircraft of such type which affords a high degree of safety and dependability, and which may be economicaly constructed. It is also an object of the invention to provide in such an aircraft a simplified control system wherein the number of controls is minimized, and the controls are of a type similar to those of conventional aircraft, so that the special skill required for piloting the aircraft is reduced, insofar as possible. These, and other desirable objects apparent hereinafter have been accomplished by the present invention, a suitable embodiment of which is described herein and shown in the accompanying drawings, in which:

Figure 2 is a somewhat diagrammatic isometric view of certain of the controls in the fuselage of the aircraft;

Figure 3 is a vertical and longitudinal section through the mast and masthead of the aircraft;

Figure 4 is a vertical and transverse section through the masthead;

Figure 5 is a top plan view of the masthead with certain portions broken away to show the structure at several levels, the upper left-hand portion of Figure 5 being generally along the line 5′ of Figure 4 and the lower right-hand portion being generally along line 5″ of Figure 4.

Figure 5A is a diagrammatic elevational view of one of the control mechanisms in the masthead;

Figure 5B is an enlarged elevational view of the mechanism generally indicated by the arrow 5B in Figure 5;

Figure 6 is a diagrammatic top plan view of a portion of the upper or rotor wing, showing certain of the control linkages therein;

Figure 7 is a diagrammatic rear elevational view of this portion of the wing;

Figure 8 is an enlarged fragmentary view of a portion of the wing indicated by the arrow 8 in Figure 6;

Figures 9, 9A and 9B are diagrammatic sectional views taken generally along the line 9—9 of Figure 6 and showing one of the flap surfaces of the wing in various positions of adjustment;

Figures 10 and 10A are fragmentary enlarged top plan views of the portion of the masthead structure generally indicated by the arrow 364 in Figure 5 and showing the wing fixing mechanism in various positions;

Figure 11 is a diagrammatic top plan view of the portion of the control system indicated generally by the arrow 11 in Figure 2;

Figures 12, 12A and 12B are diagrammatic views of certain of the control mechanisms, shown in various positions of adjustment;

Figure 13 is a fragmentary lateral elevational view of certain of the power transmission and control mechanisms at the base of the mast with certain portions broken away for clarity;

Figure 14 is a fragmentary lateral elevational view of certain of the control mechanisms in the fuselage of the aircraft with certain portions shown in section;

Figures 15, 15A and 15B are enlarged elevational views of one of the vertical control handles of the aircraft, showing said handle in various positions;

Figures 16 and 16A are respectively enlarged elevational and plan views of one of the pickup mechanisms of the aircraft; and Figure 16B is an enlarged elevational view of said mechanism, showing certain parts thereof in different position.

Similar reference characters are used to refer to similar parts throughout the several figures of the drawings.

Figure 1:
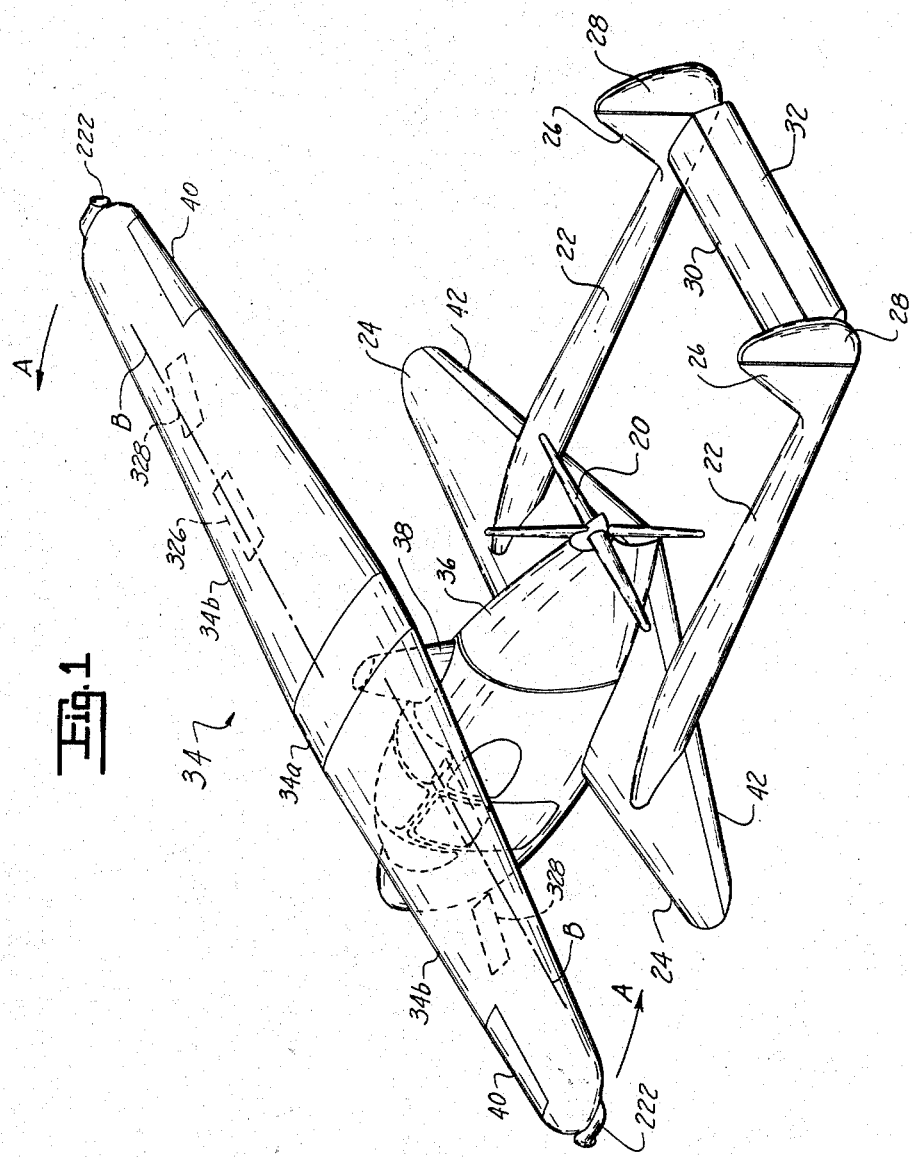
Figure 1 is an isometric overall view of an aircraft embodying features of the present invention.

As shown in Figure 1 the present invention has been incorporated in an aircraft of the sesquiplane type having twin booms 22 extending rearwardly from the lower or stub wing 24 to support the tail empennage which includes twin fins 26 and rudders 28 with a horizontal stabilizer 30 and elevator 32 extending therebetween. The upper or rotor wing 34 is of the parasol type, being supported above the fuselage 36 of the aircraft by a mast indicated generally at 38. The upper or rotor wing 34 is adapted either to be fixed in the position shown or freed for driven or auto-rotative rotary movement about the mast 38 in the direction indicated by the arrows A and in a plane generally perpendicular to the mast 38. The wing 34 is divided into three major portions: a relatively short center section 34a which rotates and oscillates (tilts) but which is fixed as to angle of attack and end portions 34b which not only rotate and oscillate, but which may be varied in angle of attack about their axes B. As can be seen, the axes B of the two end portions 34b are not colinear, since the axis B of each end portion is nearer to the rotational leading edge of the end portion than to its trailing edge. Each end portion 34b is provided at its rotational trailing edge with an aileron 40 which provides for additional control of the aerodynamic characteristics of the wing. These ailerons 40 are used only in rotary-wing flight, as indeed one of the ailerons is on the leading edge of the wing when the aircraft is in fixed-wing flight.

For the same reason—because the leading edge of one of the end portions in rotary-wing flight becomes its trailing edge in fixed-wing flight—it is preferable to have a wing of symmetrical fore-and-aft cross section. A distorted elliptical profile of the type disclosed in Patent No. 1,792,014 to Gerard P. Herrick has proven altogether satisfactory.

The lower or stub wing 24 is provided at its trailing edge with ailerons 42 for lateral (banking) control of the aircraft when flying as an airplane or autogiro. The rudders 28 provide directional (turning) control and the elevator 32 longitudinal (climbing-diving attitude) control of the aircraft for airplane flight. In rotary-wing flight the end portions 34b of he rotor wing are varied in angle of attack for vertical (altitude) control and the ailerons 40 for control of the plane of rotation of the rotor wing and therefore of the direction of movement of the aircraft. In rotary-wing flight, directional control of the fuselage 36 may be achieved by means hereinafter described.

A conventional pusher-type propeller 20 is provided for airplane and autogiro flight, while in helicopter flight, the rotor wing is driven by jets 222 at its tips.

Figure 2 shows the controls in the pilot's cockpit of the aircraft and certain of the linkages extending therefrom along the fuselage. As can be seen, there is provided a dual control of the wheel or "yoke" type employed in conventional aircraft. The yoke is linked to the ailerons 42, rudders 28 and elevator 32 for control thereof in the conventional manner when the aircraft is operated as an airplane. That is to say, in such flight translational or bodily movement of one of the control wheels 44 from left to right actuates the rudders 28 for directional control of the aircraft, transational movement of the control wheel 44 forwardly or rearwardly actuates the elevator 32 for longitudinal control and rotational movement of the wheel 44 about its axis actuates the ailerons 42 for lateral control of the aircraft. The linkages employed between the yoke and these control surfaces is of standard type and, accordingly, has been omitted from the drawings and from this description in the interest of simplification. This same yoke is also operative to actuate the controls for rotary-wing flight as will be described.

As shown in Figure 3, the vertical structure which supports the rotor wing has as its principal framing member a hollow mast 46 secured to the fuselage of the aircraft and extending upwardly therefrom. A hollow drive shaft 48 is supported coaxially and rotatably within mast 46 by means of ball bearings 50 and 52. As shown more clearly in Figure 4, a T head or crown 54 is formed at the upper end of the drive shaft 48 and above the top of the mast 46. At the forward and after sides of the crown 54 are formed sockets 56 (Figure 3) which receive the ends of stub shafts 58 which extend therefrom and are supported for rotational movement in sockets 56 by means of ball bearings 60. On the projecting end of each of the stub shafts 58 is perpendicularly mounted a shaft 61 which, through a ball bearing 63, rotatably supports a longitudinal spar 62, (see also Figure 5) which extends along the axis B (Figure 1) of one of the end portions 34b of the rotor wing. Thus, rotation of the drive shaft 48 produces rotation of the rotor wing. The hollow drive shaft 48 and the hollow spars 62 are also used to conduct compressed air from the compressor turbine in the fuselage to the jets 222 at the tips of the rotor wing, tubes 221 serving to connect the top of the drive shaft to the inner end of the two spars.

The rotor wing is free for tilting of its plane of rotation by turning of stub shafts 58 within sockets 56 (Figure 3). The plane of rotation will therefore be determined by the aerodynamic lift effective upon the rotor wing at various points in its rotation. For example, if, when the longitudinal axis of the rotor wing is momentarily fore-and-aft, the aerodynamic lift effective upon the end of the rotor wing which is then to the rear of the masthead is greater than that which is then effective on the forward portion of the rotor wing, the plane of rotation of the rotor wing will be inclined upwardly in the rear and downwardly forward, so that the aerodynamic thrust of the rotor wing has a component which tends to force the aircraft forward and advance the aircraft in that direction. By inclining the plane of rotation of the rotor wing in the opposite direction, the craft could be urged rearwardly, or by inclining the plane of rotation laterally the aircraft could be driven in directions to either side. Thus, by selective control of the aerodynamic characteristics of the rotor wing at various points in its rotation, the direction of movement of the aircraft may be controlled. This type of control is referred to herein as "cyclical" control, since the aerodynamic characteristics of each end portion of the rotor wing is altered from one value to another and back again for each revolution of the rotor wing. It is effected by means of the ailerons 40 on the rotational trailing edges of the rotor wing.

Translational movements of the control wheels 44 in a direction fore-and-aft of the fuselage produce changes in the setting of the ailerons 40 at the forward and rearward positions of the rotor wing, and rotational movements of the control wheels 44 about their axes produce changes in setting of the ailerons at athwartships positions of the rotor wing through the following mechanism: A rod 64 (Figure 2) is secured to the upright column 66 of the yoke through a universal joint 68, so that longitudinal translational movements of the control wheels 44 cause reciprocatory movements of the rod 64. A roller block 70 mounted on rod 64 bears rollers 72 which engage an inclined track 74, one end of which is pivoted to the frame of the aircraft at 76 and the other end of which is pivotally secured to a lever 78 which is in turn secured to a rod 80 extending up through the mast fairing, forward of the mast proper. As shaft 64 reciprocates, rollers 72 acting on inclined track 74 cause the track to move up or down which rotates lever 78 and reciprocates rod 80. The upper end of the rod 80 (Figure 3) is attached through a link 82 to the inner race 84 of a large ball bearing encircling the upper end of mast 46 and indicated generally at 85. Ball bearing 85 is pivoted on a fore-and-aft axis to an inner concentric gimbal ring 86 by means of pins 88, and gimbal ring 86 is in turn pivoted on an athwartships axis to the upper end of the mast 46 by means of pins 90 (Figure 4). Thus, ball bearing 85 can pivot about the mast 46 in either a longitudinal or transverse sense. As the rod 80 (Figure 3) and the link 82 are connected to the ball bearing at a point directly ahead of the mast and along the transverse center line of the aircraft, reciprocation of the shaft 80, as above described, causes an inclination of ball bearing 85 about a transverse axis.

Rotation of either of the control wheels 44 (Figure 2) rotates its axle 92 and a crank 94 depending therefrom. The lower ends of the two cranks 94 are interconnected by means of a rod 96, which is pivotally attached near its center to a crank 98 secured to the upper end of a torque rod 100 extending downwardly through the upright column 66 of the yoke. As can be seen, rotation of control wheels 44 about their axes will cause reciprocation of rod 96, rotation of crank 98 and of torque rod 100. The torque rod 100 has at its lower end a portion 100a extending laterally and perpendicularly therefrom and the end of this portion 100a is attached through a universal joint 102 to a rod 104 which extends rearwardly of the aircraft and is coupled through a roller block 106, inclined track 108 and lever 110 of the type just described to a rod 112 extending upwardly through the mast housing. As torque rod 100 and its lower portion 100a are rotated, rod 104 and roller block 106 will be reciprocated to produce rotation of inclined track 108 and lever 110 and reciprocation of rod 112.

The upper end of rod 112 (Figure 3) is connected to one end of a lever 114 whose center is pivoted to the mast 46 and whose opposite end (Figure 4) is pivotally connected through a link 124 to the inner race 84 of ball bearing 85 at one side of the masthead. Thus, as shaft 112 is reciprocated, lever 114 is rotated and inner race 84 of the ball bearing is inclined about a longitudinal axis.

An arch 126 (Figure 4) extends over ball bearing 85 and is pivotally connected at diametrically opposite points to its outer race 128. The arch 126 extends over the top of the drive shaft proper and is embraced on either side by a pair of rollers 130 mounted on the upper end of the drive shaft. Thus, arch 126 and outer race 128 of the ball bearing are caused to rotate with the drive shaft 48, while the inner race 84 of the ball bearing is non-rotative. Inclination of inner race 84 by manipulation of control wheels 44, as above described, causes inclination of outer race 128 and of the arch 126. However, since the arch is engaged by the rollers 130 it is prevented from movement in a plane normal to the longitudinal axis of the rotor wing and is allowed movement only in a plane parallel thereto. Any inclination of ball bearing 85 which would otherwise tend to produce movement of arch 126 in a plane normal to the longitudinal axis of the rotor wing merely causes "hinging" of the arch 126 about its pivot 127 (Figure 4). However, any inclination of ball bearing 85 in a plane parallel to the longitudinal axis of the rotor wing causes inclination of arch 126 as indicated in dotted lines in Figure 4, with the web of arch 126 rolling between the rollers 130. The top center of arch 126 is attached through a ball and socket joint 132 to the center of a walking beam 134 (see Figures 3 and 5) which extends generally horizontally and normally to the longitudinal axis of the rotor wing. Walking beam 134 is connected at opposite ends to rods 136 (Figures 5 and 6) which extend longitudinally of the wing in opposite directions and each of which is connected to one of the ailerons 40 through a horn mechanism of conventional type indicated generally at 138 (Figure 6). Thus, translational movements of the walking beam 134 in a direction parallel to the longitudinal axis of the rotor wing produced by inclination of arch 126, as above described, produce reciprocation in unison of the shafts 136, that is, they both move in the same absolute direction, but with respect to their respective rotor tips they move in opposite directions, one being pulled in and the other being pushed out and cause movement in opposite directions of the two ailerons 40.

When control wheels 44 are moved bodily fore and aft, to obtain longitudinal control of the aircraft in rotary-wing flight, for example, the ball bearing is inclined about the transverse axis. When the rotor wing is oriented transversely of the aircraft this inclination of ball bearing 85 does not affect the ailerons, becaues rollers 130 maintain arch 126 in vertical position, and the inclination of the ball bearing 85 is taken up by hinging of arch 126 about pivot 127. However, when the rotation of the rotor wing carries it so that it is oriented longitudinally of the aircraft, hinge 127 can not take up the movement of ball bearing 85, and arch 126 is forced by the ball bearing to rotate through the rollers 130 without departing from its vertical plane. This moves walking beam 134 bodily in a direction parallel to the longitudinal axis of the rotor wing, pulling one of the shafts 136 and pushing the other to move the ailerons in opposite directions, varying the aerodynamic lift in the two portions of the wing oppositely and causing inclination of the plane of rotation of the rotor wing about a transverse axis.

Similarly, rotation of control wheels 44 about their axes will produce no effect on the ailerons 40 when the rotor wing is oriented longitudinally of the aircraft and will effect inclination of the plane of the rotor wing only about a longitudinal axis. It will be seen that the longitudinal and lateral controls may be used individually, or in any combination to produce movement of the aircraft in any desired direction.

Walking beam 134 serves the purpose of balancing the forces acting upon the two ailerons 140. It can be seen that the extent of the translational movement of walking beam 134 controls the total extent of movement of the two ailerons, but that the relative extent of movement of the two ailerons will be such that the aerodynamic forces acting upon them are always equalized.

The inclined tracks 74 and 108 and the cooperating roller blocks 70 and 106 serve the purpose of minimizing the amount of force fed back through the system from the ailerons to the control wheels. Since the rotor wing in helicopter flight is normally rotating at a velocity of the order of 360 R. P. M. and the rotor wing tips are accordingly traveling at an average speed of the order of 400 M. P. H., the aerodynamic force acting upon the ailerons is comparatively great. In the conventional system of control linkage, virtually all of this force acting upon the ailerons would be transmitted back to the control wheel, making it difficult to move or hold the control wheel against this force and producing excessive fatigue of the pilot. Since the tracks 74 and 108 are inclined at a small angle relative to the horizontal, the force applied to the rods 80 or 112 (Figure 2) cannot cause movement of the rods 64 or 104, so that force applied to the ailerons 40 will not be transmitted to the control wheels 44.

The aileron control rods 136 (Figure 6) are normally urged outwardly by centrifugal force caused by rotation of the rotor wing, and this normally tends to cause actuation of the ailerons 40. While this tendency is substantially prevented by virtue of the immovability of the inclined tracks 74 and 108 by the rods 80 and 112, it might cause some spurious movement of the ailerons due to "play" in the linkages. Accordingly, a weight 140 (Figure 6) is attached at one end of a lever 142 which is centrally pivoted to the wing and whose opposite end is connected at the end of the aileron control rod 136. As the wing rotates, the weight 140 is urged centrifugally outward, and this force, acting through lever 142, urges the aileron control rod 136 inward, counteracting its centrifugal force.

In controlling the ailerons, translational movement of walking beam 134 pulls one of the control rods 136 inwardly and pushes the other outwardly to move the two ailerons in opposite directions. This outward movement of weight in one end portion of the rotor wing in inward movement in the other end portion would normally unbalance the rotor wing and produce vibration at the high rotational speeds encountered. The weights 140, however, move in opposite directions to the control rods 136 and keep the rotor wing in balance.

In rotary-wing flight, the fuselage of the aircraft is suspended from the rotating wing and is, of course, rotatable with respect thereto. The jets 222 used to drive the rotor wing in helicopter flight do not react against or apply any appreciable torque to the fuselage. If the aircraft has a substantial component of horizontal velocity, the fuselage will normally tend to line up in the direction of flight just as a weather vane. However, when the aircraft is horizontally stationary or when it is desired to head the fuselage in any direction other than that in which the aircraft is moving, it becomes necessary to apply directional control. In providing this control, advantage is taken of the forces of action and reaction between the rotating wing and the fuselage. When it is desired to turn the fuselage in the same direction as the rotor wing is rotating, a bank brake attached to the fuselage grips the rotating mast, imparting to the fuselage a desired amount of force in that direction. When it is desired to turn the fuselage in a direction opposite to that in which the rotor wing is rotating, a small supplementary motor mounted in and reacting against the fuselage and coupled to drive the rotor wing, is energized to apply to the rotor wing a force which tends slightly to increase the rotative force acting upon it. The reaction against the fuselage is such as to cause the fuselage to turn in the opposite direction.

Lateral translational movement of the control wheels 44 effects this directional control through the following mechanisms: a stub shaft 144 (Figure 2) is mounted along one side of the upright column 66 of the yoke and is pivotally attached to the lower end of the column 66, so that stub shaft 144 will partake of lateral movements of column 66, but not of the longitudinal movements of the column 66 when the yoke is moved for longitudinal control of the aircraft, as above decribed. Lateral translational movements of the control wheels 44 will produce lateral movements of column 66 and of stub shaft 144. The upper end of stub shaft 144 is connected through a link 146 to one arm of a bell crank 148, whose other arm is connected to a rod 150 which in turn is connected through a pickup mechanism 152 to another shaft 150'; lateral movements of stub shaft 144 will produce rotational movements of bell crank 148 and reciprocatory movements of the rod 150, and of the shaft 150' when the pickup mechanism 152, which will be described in greater detail hereinafter, is in the proper position. Shaft 150' is connected to the lower end of a lever 154 which is centrally pivoted at 154a and whose opposite end is connected by a link 156 to a band brake 158 on the lower end of the mast 48. Lever 154 is also connected by means of a link 160 with a rheostat 162 which controls the supply of power to an electric motor 164 (Figure 13) which is coupled through a planetary gear system indicated generally at 166, and which will be described more fully hereinafter, to the mast 48. Lateral movement of the control wheels 44 in one direction applies tension to the band brake 158 and causes the fuselage of the aircraft to turn in the same direction as the rotor wing, and movement of the control wheels 44 in an opposite direction adjusts the rheostat 162 to apply power to the motor 164, increasing the rotary forces acting upon the rotating wing, and by virtue of the reactive force, causes the fuselage to turn in the opposite direction.

Preferably, the linkages are so adjusted that at the lateral center position of the control wheels 44, the band brake 158 is slightly tensioned and the rheostat 162 is adjusted to apply very low power to the motor 164, the forces created by the band brake and by the motor counteracting each other and tending to hold the fuselage of the aircraft on its heading. Such adjustment also serves to eliminate any possible lost motion in the control.

In helicopter operation, it is advantageous to provide the aircraft with vertical control—that is, means whereby the aircraft can be caused to gain or lose altitude; this is especially desirable when the aircraft is "hovering," that is, not advancing in any horizontal direction. In the present embodiment, this control is accomplished by means of equal variations of the angle of attack of the two end portions 34b of the rotor wing, which varies the aerodynamic lift of the rotor wing without effecting any tilting of its plane of rotation.

Since vertical control is not desired for fixed-wing flight, a separate control handle is provided for effecting this control. This is the handle 168 which is pivoted at 170 for movement in a vertical plane. The after end of handle 168 is formed with a segmental circular frame 172 having an internal arcuate gear rack 172a. Meshing with rack 172a is a pinion 174 keyed to the same shaft as a worm 176 which engages a worm wheel 178 on the forward end of a torque rod 180 extending rearwardly of the fuselage. A spaced pair of arms 182 extend from the torque rod 180, each arm 182 being pivotally secured to the lower end of a rod 184 which extends upwardly through the mast fairing, one forward and one rearward of the mast proper. Raising or lowering handle 168 causes movement of rack 172a, rotation of pinion 174, worm 176, worm wheel 178 and torque rod 180 to swing arms 182 in a vertical plane and reciprocate vertical shafts 184.

The upper ends of rod 184 (Figure 3) are secured to links 186 at opposite sides of the outer race 188 of a ball bearing whose inner race 190 is secured to a collar 192 which surrounds the upper end of the drive shaft 48 and is supported coaxially therewith by means of ball bearings 194. The ball bearings 194 are received in conforming recesses in the collar 192 and in vertical grooves in the drive shaft 48, so that they permit substantially frictionless vertical movement of collar 192 with respect to the upper end of drive shaft 48 while securing the collar against lateral or rotational movement relative to the drive shaft. Collar 192 thus rotates with the drive shaft, the ball bearing assembly including races 188 and 190 allowing rotation of collar 192 with respect to the vertical shafts 184, while securing the collar 192 for vertical reciprocatory movements by the shafts 184.

A pair of pins 196 project from opposite sides of the collar 194, and each engages a bell crank 198 which is pivoted at 200 for movement in a vertical plane and whose opposite end is pivotally and slidably attached to a sleeve 202 which is slidably mounted on a rod 204 extending from the drive shaft 48 to the inner end of one of the sockets 56. As collar 192 is vertically reciprocated by the movement of the control handle 168 (Figure 2) bell cranks 198 are rotated in a vertical plane, causing sleeves 202 to slide inwardly and outwardly along rods 204. Encircling each of the sleeves 202 is a ball bearing from whose outer race 206 a pin 208 extends upwardly. Each of these pins 208 forms the fulcrum of a lever 210 (Figure 5) one end of which is pivotally secured to the masthead at 212 and the opposite end of which carries two pairs of rollers 214 and 216.

The inner pair of rollers 214 are one above the other and secured to the lever 210 for rotation about fixed horizontal axes. This pair of rollers 214 embrace between them an arcuate track 218 mounted on the center section 34a of the rotor wing, track 218 being straight and horizontally mounted. The outer pair of rollers 216 are mounted for rotation about a horizontal axis on a circular insert 219 which is secured to lever 210 for rotation in a vertical plane. The rollers 216 embrace between them an arcuate track 220 mounted at the inner end of one of the end portions 34b of the rotor wing, track 220 being concentric with track 218 and spaced a short radial distance therefrom. As shown in Figure 5A, track 220 has a short portion 220a at one end which is horizontal, but has its major portion 220b inclined at an angle of some 30 degrees with respect thereto. As the sleeves 202 (Figure 3) are moved inwardly and outwardly along the rods 204 by manipulation of the control handle 168 (Figure 2), the levers 210 are caused to rotate in a horizontal plane about their pivots 212, moving the rollers 214 and 216 along their respective tracks 218 and 220. The track 218 being secured to the center section of the wing and being therefore immovable, and being embraced by the rollers 214, as the rollers 214 move along the track 218, the lever 210 will be allowed movement only in a horizontal plane and will be denied vertical movement. As the outer rollers 216 move along the inclined portion 220b of their track 220 the end portions 34b of the rotor wing will be rotated about their axes B, thereby varying their angle of incidence and the aerodynamic lift of the rotor wing.

When the outer rollers 216 are in contact with the horizontal portion 220a of their track 220, the plane joining the axes of the two wheels is vertical as shown, but when the wheels 216 are in contact with the inclined portion 220b of their track 220, the plane joining their axes is tilted from the vertical. Rotation of the insert 218 accommodates this tilting.

The present aircraft may suitably employ a turbojet engine of the type disclosed in the copending application of Gerard P. Herrick, Ser. No. 132,957, filed December 14, 1949, now Pat. #2,675,195, April 13, 1954, having compressor turbine facilities not only for the airplane engine but for the jets 222 at the tips of the rotor wing. When such a turbo-jet engine is used, variation of the quantity of fuel supplied to the combustion chambers of the compressor turbine of such engine serves not only to control the power applied to the propeller 20 in fixed-wing flight, but also affects to some extent the power realized from the jets 222 in rotary-wing flight, since it varies the supply of compressed air to these jets. In rotary-wing flight, however, additional controls are provided.

Reference character 224 in Figure 2 indicates a manual control which is connected to the valve in the fuel line to the compressor turbine. This is the only throttle control for fixed-wing flight. In rotary-wing flight the control handle 224 is normally set at a certain point and left there, except for abnormal changes in flight. Since, in rotary-wing flight, both hands of the pilot are generally occupied, one with the control wheel 94 and the other with the vertical control lever 168, it has been found advantageous to provide means for controlling the supply of fuel to the rotor wing jets 22 by means of a foot pedal.

As shown in Figure 2, a pair of foot pedals 226 are provided, one at either side for the convenience of pilots in either of the two control positions. Each pedal is mounted on the upper end of a post 228 which is pivoted to one end of an arm 230, whose opposite end is secured to one end of a torque rod 232, which extends transversely of the fuselage between two arms 230. The pedals 226 are resiliently urged upwardly by means of springs 234 compressed between the under side of the pedals 226 and the floor board of the cockpit. One end of another arm 236 is secured to the center of the torque rod 232 and its opposite end is pivotally attached to a rod 238 which extends rearwardly along the fuselage and is attached at its after end to the center of a lever 240. The upper end of the lever 240 is slidably pivoted in a slot 242a of another lever 242. The opposite end of the lever 240 is pivotally attached to the diagonally extending arm of a bell crank 244 which is centrally pivoted and which has a vertical arm whose upper end is pivotally attached to a rod 246 extending rearwardly and attached to the rotor wing jet fuel valve in the customary manner to vary the opening of this valve when the shaft 246 is reciprocated. Turning of the torque rod 232, caused by depression of the foot pedals 226, rotates arm 236 and reciprocates rod 238 and pulls or pushes the center of the lever 240. Since slot 242a of lever 242 which engages upper end of lever 240 is inclined at an appreciable angle to the horizontal, the upper end of the lever 240 will not move along the slot 242a and is, for the action now being described, effectively a fixed pivot. Accordingly, reciprocation of the rod 238 rotates lever 240 about its upper end as a pivot, moving the lower end of crank 244 forwardly or rearwardly and moving its upper end forwardly or rearwardly in an opposite sense to reciprocate rod 246 and adjust the fuel valve as desired.

When the angle of incidence of the end portions 34b of the rotor wing are varied for vertical control, their aerodynamic drag is also effected, which varies the amount of power necessary to drive the rotor wing at a given rotational speed. Accordingly, it is desirable to control the fuel supply to the rotor wing jets at the same time the vertical control lever 168 is moved, if constant speed of rotation of the rotor wing is to be achieved. In the present aircraft, means are provided for varying the opening of the rotor wing jet fuel valve automatically in accordance with movements of vertical control handle 168. As shown in Figure 2, the connection between vertical control handle 168 and the fuel control valve includes an arm 248 secured at one end to the after arm 182 in the vertical control system, which arm 182 is rotated in a vertical plane as the vertical control handle 168 is moved up or down. The other end of arm 248 is secured through a universal joint 150 to one end of a link 152 whose opposite end is pivotally secured to the upper end of the diagonally inclined lever 242. The opposite end of lever 242 is pivoted at 254. As arm 182 is rotated in a vertical plane, link 252 is vertically reciprocated and the lever 242 is rotated in a vertical plane about its pivot 254. This causes lever 240 to be longitudinally reciprocated, moving the lower end of the crank 244 upwardly or downwardly and the upper end of the crank 244 forwardly or rearwardly to reciprocate the shaft 246 and adjust the rotor wing jet fuel valve so as to maintain the speed of rotation of the rotor wing constant, despite changes in its angle of incidence. As lever 240 is moved upwardly or downwardly, the shaft 238 is merely rotated through a small angle about its forward end as a pivot without longitudinal reciprocation and, accordingly, without movement of the foot pedals 226. The foot pedals 226 and the vertical control handle 168 accordingly are arranged so that each can control the fuel valve without affecting the other.

The same control wheels are used in controlling the aircraft when flying as an airplane, and similar movements of the control wheels produce similar changes in the attitude and direction of the aircraft in all types of flight. The airplane control surfaces—the ailerons 42, rudders 28 and elevator 32 are not "dropped" or operatively disconnected from the control wheels during rotary-wing flight, since their movement during such flight has no disadvantage, but rather serves to augment the controls for rotary-wing flight. These latter controls, however, are dropped when converting to airplane flight. The means for achieving such conversion will now be described.

As mentioned above, the compressor turbine is in operation in all types of flight. In airplane and autogiro flight, some of the compressed air from this turbine is fed to the combustion chambers associated with the turbine which drives the propeller 20, while in helicopter flight this compressed air is instead routed to the jets 222 at the rotor wing tips. The fuel and spark are also switched between the propeller turbine and the rotor wing jets, in converting from airplane or autogiro to helicopter flight or vice versa. This, and certain other functions of conversion, are effected by means of mechanisms associated with a single lever operable from the pilot's position. This lever 256 is mounted generally vertically, its lower end supported by means of a universal joint 258 on the floor of the cockpit and with its shank extending through and supported by an arcuate guide 260. As shown more clearly in Figure 11, the guide 260 has a zigzag opening 260a therein through which the shank of the control handle 256 is admitted. The control handle 256 is adjustable to various fore-and-aft positions in the opening 260a, the construction being such that in moving from most fore-and-aft positions to others, it is necessary first to move the handle 256 laterally, thus effectively limiting the fore-and-aft movements of handle 256 against unintentional exaggeration. A locking device, not shown, is provided to retain handle 26 in the fore-and-aft position in which it has been placed.

A stub shaft 262 is mounted alongside conversion control handle 256 and is attached to the lower end thereof in such manner as to partake of the fore-and-aft movement of handle 256 while allowing independent lateral movement thereof. In the present embodiment, the foremost position of handle 256 and stub shaft 262 correspond to conventional airplane flight, while the aftermost position of handle 56 and stub shaft 262 produces conventional helicopter flight, and at one or more intermediate positions of the handle, the plane is set for autogiro flight.

The forward section 264' of a jointed shaft 264 is pivotally attached near the upper end of stub shaft 262 and shaft 264 extends aft therefrom along the fuselage of the aircraft. As stub shaft 262 is moved fore-and-aft by conversion of the control handle 256, shaft 264 is reciprocated, the jointed construction allowing the forward section 264' of the shaft to follow the vertical component of movements of the stub shaft 262, while the after portion of the shaft remains in the same horizontal plane. The after portion of shaft 264 is connected as shown in Figure 12 to the armature 266a of a switch 266, and the control arms 268a and 270a of valves 268 and 270, respectively. Switch 266 controls the ignition and valves 268 and 270 respectively control the supply of fuel and compressed air to the propeller turbine combustion chambers and the rotor wing jets. Switch 266 has upper and lower arcuate portions, the upper arcuate portion having a metallic contact 266b extending for part of its length and the lower arcuate portion having a similar contact 266c. Armature 266a is electrically connected to the source of ignition, contact 266b to the propeller turbine combustion chambers and contact 266c to the rotor wing jets. With conversion control handle 256 and stub shaft 262 in the extreme forward position, as shown in Figure 2, armature 266a will be in its extreme clockwise position, as shown in Figure 12. In such position, it is effective to supply ignition to the propeller turbine combustion chambers and not to the rotor wing jets. As will be appreciated from the length and arrangement of the contacts 266b and 266c, this electrical condition of switch 266 will obtain throughout most of the movement of the armature 266a. The contact 266b terminates at a point corresponding to a point somewhere between the positions marked f and g on conversion control handle guide 260 (Figure 11). Contact 266c extends from the forward end of the lower arcuate portion to a point corresponding to one intermediate the positions e and f of guide 260. Thus, when conversion control handle 256 is moved aft, ignition is supplied only to the propeller turbine combustion chambers in positions a through e of the conversion control handle. At position f of handle 256, ignition is supplied to both the propeller turbine combustion chamber and to the rotor wing jets, as shown in Figure 12a and in position g—the helicopter position—ignition is supplied only to the rotor wing jets, as shown in Figure 12B.

The valves 268 and 270 are provided with central openings 268b and 270b respectively, which are respectively connected to the fuel pump and the compressor turbine. Each of these valves is provided with ports fore and aft, the forward port in each case communicating with the rotor wing jets and the after port communicating with the propeller turbine combustion chamber. The rotors 268c and 270c of the valves are similar and are so shaped and oriented that in the forward position of the control handle 256 the after port of each valve will be open, supplying fuel and compressed air to the propeller turbine combustion chamber, and the forward port of each valve will be closed, cutting off the supply of fuel and air to the rotor wing jets. When the control handle 256 is in the position f, as shown in Figure 12A, both the forward and after ports are half open so that half of the available fuel and compressed air will be supplied to the propeller turbine and half to the rotor wing jets. Thus in position f, both the propeller 20 and the rotor wing jets 222 will be supplied power at roughly half their normal level. In position g of handle 256, as shown in Figure 12B, the supply of fuel and air to the compressor turbine combustion chambers will be cut off and routed entirely to the rotor wing jets, so that the propeller 20 is supplied no power from this source (and may be feathered or idled by exhaust gases from the compressor rotor), while the rotor wing jets are supplied full power for helicopter flight.

It can thus be seen that in shifting from plane to helicopter flight the entire supply of power need not be abruptly shifted from one motor to the other. Rather, there is an intermediate step wherein part of the power may be shifted from the engine theretofore in use to the engine desired to be used. This affords an opportunity for the pilot to "feel out" or test the latter engine for proper operation before placing his entire reliance thereupon. It can also be seen from an examination of the structure shown in Figure 12 that the relation between the switch 266 and the valves 268 and 270 is such that in switching from one engine to the other the fuel and air supply is cut off the motor theretofore in use before the ignition is removed. This insures that an explosive mixture does not remain in the combustion chambers of that motor. It can also be seen that the ignition is supplied to the motor which is desired to be used before the fuel and air supply in commenced, preventing possible flooding of the combustion chamber by prolonged pumping of fuel thereinto before applying ignition. In switching from plane to helicopter, for example, the sequence of operation is as follows: first, fuel and then air are cut off to the propeller turbine combustion chambers; second, ignition is cut off from the propeller turbine combustion chambers; third, ignition is supplied to the rotor wing jets; and fourth, air and then fuel are supplied to the rotor wing jets.

Since the vertical control is used only in rotary-wing flight, it is necessary when converting from rotary- to fixed-wing flight to return the vertical control lever to the position at which the end portions of the rotor wing are aligned with the center section and each other (zero or low angle of attack) and secure the handle in such position. This is accomplished by means of a pair of levers 272 and 274 which are pivotally mounted beneath the vertical control handle 168 at 272a and 274a respectively. Each of the levers bears at its upper end a roller, 272b and 274b respectively, adapted to cooperate with the under surface of control handle 168. Levers 272 and 274 are interconnected by a link 276, and the forward lever 272 is in turn operatively connected to the stub shaft 262 which moves with conversion control handle 256 by means of a link 278, a lever 280 and another link 282. It can be seen that forward movement of the conversion control handle 256 will move stub shaft 262 forward, push link 282, rotate lever 280 and push link 278 and levers 272 and 274 rearwardly. The system is so arranged and the under surface of vertical control handle 168 is so shaped that movement of the levers 272, 274 will produce movement of vertical control handle 168 in the manner shown in Figures 15, 15A and 15B.

Figure 15 illustrates the position of levers 272, 274 and of vertical control handle 168 when conversion control handle 256 is in position g of opening 260a of guide 260 (Figure 11). At such position, roller 272a of forward lever 272 is in engagement with the under surface of vertical control handle 168, while after lever 274 is pulled so far forward that its roller 274b is considerably below the under surface of vertical control handle 168. The placement of forward lever 272 is such as to prevent movement of vertical control handle 168 below that position at which rollers 46 on lever 210 (Figures 5 and 5A) are at the intersection between the inclined portion 220b of track 220 (Figures 5 and 5A) with its straight portion 220a. The clearance of after lever 274 beneath the under surface of the vertical control handle 168 allows for upward movement of the handle above such position to adjust the angle of attack of the end portions 34b of the rotor wing to cause the aircraft to gain or lose altitude as desired.

Movement of conversion control handle 256 to position e (Figure 11) causes movement of levers 272 and 274 to the positions indicated by the dotted lines e in Figure 15. This produces no movement of the vertical control handle 168, since roller 272b of forward lever 272 has moved along a portion 168a of vertical control handle 168 which is arcuate with respect to pivot 272a of lever 272. Thus the aircraft is still subject to vertical control by movement of vertical control handle 168.

Further movement of conversion control handle 256 to position d (Figure 11) causes movement of levers 272 and 274 to the position shown in Figure 15A.

After lever 274 has now engaged the under surface of vertical control handle 168 to prevent downward movement of the after end of the control handle. Forward lever 272 still engages the under surface of vertical control handle 168 to prevent downward movement of the forward end thereof. Thus vertical control handle 168 is locked at a position such that end portions 34b of the rotor wing are adjusted for the angle of attack optimum for autogiro flight.

Further movement of conversion control handle 256 to position b (Figure 11) will cause movement of levers 272 and 274 to the position shown in full lines in Figure 15B. After lever 274 has forced the after end of vertical control handle 168 upwardly, its forward end downwardly. Forward lever 272 has cleared the under surface of vertical control handle 168 to accommodate this movement. At such position the end portions 34b of the rotor wing are aligned with center portion 34a, the position for airplane flight.

Further movement of conversion control handle 256 to position a (Figure 11) will cause movement of levers 272, 274 to the positions indicated by dotted lines in Figure 15B but this will produce no movement of vertical control handle 168 since roller 274b of after lever 274 is merely moved along a portion 168b of the under surface of handle 168 which is arcuate with respect to pivot 274a of after lever 274.

In fixed-wing flight it is necessary that the cyclical control be dropped and the ailerons 40 returned to neutral position and locked there. This is accomplished by means of mechanism shown in Figures 6 and 7. This mechanism is adapted to be automatically actuated by alignment of end portions 34b with center portion 34a of the rotor wing when conversion control handle 256 is moved from position c to position b as has just been described.

In aileron control rod 136 (Figure 6) extending from the walking beam 134 to each of the ailerons 40 there is imposed a pick-up mechanism generally indicated at 284. This pick-up mechanism 284 is utilized several times in the present aircraft. The present pick-up mechanism 284 is typical; it is shown at enlarged scale in Figures 16, 16A and 16B. It comprises an arcuate track 286 which is pivotally attached at one end to one portion 136 of the control rod and at the other end 286a is pivotally secured to the frame of the aircraft. Track 286 is engaged by one end of a link 288 whose opposite end 288a is pivotally secured to the other portion 136′ of the control rod. The control rod is supported for axial reciprocation in bearings 290 and 292 on the frame of the aircraft. When link 288 is in the position at the end of track 286 adjacent rod 136, as shown in Figure 16B, it is co-linear with rods 136 and 136′ and forms with them an effectively continuous rod, so that reciprocation of rod 136 will produce reciprocation of rod 136′. When link 288 is moved to the fixed end 286a of track 286, as shown in Figure 16A, reciprocation of rod 136 causes rotation of track 286, about its pivot 286a, but it causes no movement of link 288 and rod 136′, since link 288 adjoins track 286 at its pivot 286a.

Since pivot 286a is a fixed pivot, when link 288 is in the position shown in Figure 16A, its opposite end 288a must be at a point whose locus is arcuate with respect to pivot 286a at a radius equal to the length of link 288. Also, since end 288a is attached to rod 136′ and since rod 136′ is prevented by bearing 292 from other than axial movements, the end 288a must also be co-linear with rod 136′. Its position is therefore fixed at the intersection of its arcuate locus and the line of rod 136′. Thus, when link 288 is moved to such position, rod 136′ is always returned and secured in the same position—in each case corresponding to the neutral position of the control surface involved.

Referring again to Figures 6 and 7, the rod 300 is reciprocated for actuation of the pick-up mechanism 284 by means of bell crank 302, rod 304 and bell crank 306. Bell crank 306 is mounted at the inner edge of the end portion 34b of the rotor wing, adjacent the center portion 34a and is adapted to cooperate with a lug 308 fixedly mounted on the center portion 34a. When end portion 34b is aligned with center portion 34a by movement of conversion control handle 256 from position c to position b (Figure 11) as above described, bell crank 306 is rotated counterclockwise as viewed in Figure 7, pushing rod 304, rotating bell crank 302 counterclockwise, as viewed in Figure 6, and pulling rod 300, fork 294 and link 288 to the position shown in Figures 6 and 16A, where the aileron control is returned to neutral position and secured there. Movement of conversion control handle 256 in the reverse direction (from position b to position c) produces an opposite movement of the linkages to activate the aileron control.

Any tendency of the aileron 40 on the leading edge of the wing in fixed-wing flight to vibrate is overcome by means of a pair of locking members 310 and 312 (Figure 6) which are automatically actuated to engage and lock the ailerons in converting from rotary- to fixed-wing flight. Locking member 310 is centrally pivoted at 310a to the rotor wing adjacent the outer end of the aileron 40. It has a finger 310b which is adapted to protrude from the rotor wing toward the outer end of aileron 40 and engage a recess therein. Locking member 310 is urged in a direction for engagement of finger 310b with aileron 40 by means of spring 314 tensioned between the opposite end of locking member 310 and the rotor wing, thus locking the aileron 40 in neutral position in fixed-wing flight. The end of locking member 310, adjacent finger 310b is weighted, so that when the rotor wing is rotating at appreciable speeds, locking member 310 is rotated by centrifugal force against the resistance of spring 314 to disengage finger 310b from aileron 40 and allow movement of the aileron. Locking member 312 at the opposite end of aileron 40 is of similar construction, except that its weighted portion 312a is opposite the end which engages aileron 40, since locking member 312 must be rotated by centrifugal force in a direction opposite to that of locking member 310 for disengagement of aileron 40 during rotary-wing flight. The locking members 310 and 312 are interconnected for simultaneous movement by means of links 316 and 318 and walking beam 320.

The dropping of the helicopter directional control when converting from rotary- to fixed-wing flight and the resumption of such control when performing the contrary conversion is accomplished by means of the pickup mechanism generally indicated at 152 (Figure 2) interposed between the directional control rods 150 and 150′. This pickup mechanism is of the same type as that just described and the description need not be repeated. The fork which actuates the link of the pickup mechanism to drop or resume directional control is formed integrally with a slotted lever 322 which is engaged by a pin 324 extending from the upper end of the stub shaft 262 which moves with the conversion control handle 256. The forward portion 322a of the slotted lever 322 is arcuate with respect to pivot 258 of stub shaft 262 and conversion control handle 256, so that movement of conversion control handle 256 between positions a and c (Figure 11) will cause no movement of slotted lever 322. The after portion 322b of slotted lever 322 however extends upwardly so that movement of conversion control handle 256 from position c to position d (Figure 11) will cause track 322 to be rotated in a clockwise direction, as viewed in Figure 2, raising the link of pickup mechanism 152 and rendering the directional control operative. Further movement of conversion control handle from position d to position g will produce no further movement of track 322. Movement of conversion control handle 256 in the reverse direction to that just described will cause directional control to be dropped between positions d and c.

In converting from rotary- to fixed-wing flight the rotation of the rotor wing must be stopped and the rotor wing locked in place at the proper position for fixed-wing flight. Deceleration of the rotor wing in the present aircraft is accomplished by aerodynamic means. A pair of flaps 326 and 328 are mounted on the under side of each of the end portions 34b of the rotor wing. Each of these is mounted for rotation about a longitudinal axis 326a, 328a, respectively, intermediate the leading and trailing edges of the flap. The flaps are actuated by means of levers 330, as shown more clearly in Figures 9, 9A and 9B. Each of the levers 330 is pivotally mounted on the frame of the rotor wing, as shown at 330a. At one end of lever 330 is formed a ball 330b which is adapted to contact one side of aileron 326. One end of a spring 332 is tensioned between lever 330 and the leading edge of aileron 326, so that aileron 326 is normally urged toward the open position. Aileron 326 is normally prevented from opening, however, by ball 330b on lever 330 contacting aileron 326 forward of its axis 326a, as shown in Figure 9A. Rotation of lever 330 to the position shown in Figures 9 and 9B moves ball 330b to the rear of axis 326a of aileron 326, and allows spring 332 to open the flap. If there were no air flow against aileron 326, it would be opened by spring 332 to the position shown in Figure 9. However, when the flaps are first released, the air pressure against them, due to high speed rotation of the rotor wing, is such that they open only to the position shown in Figure 9B. As the flaps effect a gradual retarding of the rotation of the rotor wing, the air pressure against the flaps is diminished gradually so that the flaps gradually open and reach the position shown in Figure 9 as the rotor wing comes to a stop. The flaps may then be closed by moving lever 330 again to the position shown in Figure 9A.

The levers 330 for the two flaps on each end portion 34b of the rotor wing are connected to a common control rod 334 (Figure 6) which is reciprocated for opening and closing of the flaps in the following manner: a bell crank 336 is connected to control rod 334 and to another rod 338 which in turn is connected to one end of a centrally pivoted lever 340 whose opposite end is adapted to cooperate with the end of lever 210 (Figure 5) which controls the angle of attack of end portions 34b of the rotor wing. The end of lever 340 adjacent lever 210 is provided with a "flipper" 340a so that when lever 210 engages the flipper 340a when lever 210 is moving in a clockwise direction, as viewed in Figure 5, the flipper does not yield but causes lever 340 to be rotated in a counterclockwise direction by lever 210. When lever 210 is moved in the opposite direction, the flipper 340a is merely pressed out of the way without movement of lever 340. Lever 340 is so positioned that its flipper 348 is contacted and moved by lever 210 during the time when lever 210 and its rollers 216 are moving along the straight portion 220a (Figure 5A) of track 220—in other words, at a time when lever 210 is producing no change in angle of attack of the end portions 34b of the rotor wing. This corresponds to the extreme downward position of vertical control handle 168 (Figure 2), to which vertical control handle 168 is moved by levers 272 and 274 when conversion control handle 256 is moved from position c to position b (Figure 11). Thus, movement of conversion control handle 256 between these positions will produce movement of the vertical control handle 168, such as to cause lever 210 (Figure 5) to traverse the straight portion 220a of track 220, causing no change in angle of attack in the end portions 34b of the rotor wing, but causing lever 210 to actuate lever 340 to release the flaps for stopping the rotor wing.

Lever 210 passes completely by flipper 340a of lever 340 before lever 210 reaches its limit of travel—in other words, lever 210 engages flipper 340a only momentarily and then ceases to bear against it. Tension of the spring 332 on each of the flaps tends to pull lever 330 in a direction for closing the flaps. This force is augmented by air pressure against the aileron. Since lever 340 is engaged by lever 210 only momentarily, nothing has been mentioned thus far which would prevent spring 332 and the pressure against the flaps from pulling the control rods 334 and its associated mechanism to close the flaps. This is prevented by means of latch 342 (Figure 5) which is spring biased to engage a notch 334a in the inner end of control rod 334 when control rod 334 is moved to the position for opening the flaps. Latch 342 serves to lock control rod 334 and levers 330 in the position for opening the flaps after lever 210 has passed flipper 340a of lever 340 (Figure 5). Latch 342 is unlocked for closure of the flaps by means which will be described hereinafter.

In the present aircraft the rotor wing is first stopped and then caused to rotate a fractional revolution in the direction reverse to its normal direction of rotation before locking it in position for fixed-wing flight. There is thus a definite limit on the rotational velocity of the rotor wing at the time the locking mechanism is actuated, so that the danger of damage to the locking mechanism by excessive speed of the rotor wing is eliminated.

This reverse force is imparted by the flaps 326 and 328. At the time the rotor wing comes to a stop, the flaps reach the position shown in Figure 9A. Since the aircraft is given some forward speed before conversion, and since the flaps on the starboard side of the aircraft present greater aerodynamic drag than those on the port side of the aircraft, the rotor wing is urged in a direction contrary to the direction of arrows A in Figure 1. As can be seen, in Figures 1 and 6, the axis 328a of one of the flaps 328 on each rotor wing is at an angle with respect to the other flap 326 so that the rotor wing can not stop on "dead center" but that at any position of the rotor wing when the flaps are open, a force is exerted on the rotor wing which urges it in a direction contrary to that indicated by arrows A in Figure 1.

As hereinbefore described, the rotor wing is mounted for oscillation about stub shafts 58 (Figures 3 and 5) and at the time of conversion from rotary- to fixed-wing flight the rotor wing may be tilted from a horizontal plane. For fixed-wing flight, it must be returned to a horizontal position and locked there. This is accomplished by means of jacks indicated generally at 344 (Figure 4). Each of these includes a screw 346 which is threaded through a flange 348 on the frame of the center portion 34a of the rotor wing. The upper face of each screw is adapted to cooperate with a spring shoe 350 which is secured to the underside of the crown 54. When screws 346 at either side of center portion 34a of the rotor wing are in their uppermost positions, as shown in Figure 4, they bear against shoe 350 and prevent tilting of the longitudinal axis of the rotor wing with respect to crown 54. Screws 346 are rotated for movement up or down in flanges 348 by means of pinions 352 extending downwardly from screws 346, and each engaging a sector gear 354 (Figure 5). The sector gear 354 is pivoted to the rotor wing center section 34a at 354a and during rotary-wing flight is positioned as shown in dotted lines in Figure 5. A pair of fixed fingers 356 and 358 are formed integrally with sector gear 354 and the latter finger 358 is adapted to cooperate with a movable finger 360 which is pivoted to the sector gear assembly at 360a. Movable finger 360 also has a weighted portion 360b which, during rotation of the rotor wing, is urged outwardly by centrifugal force, rotating the movable finger to the position indicated by the dotted line z in Figure 5. The path of movable finger 360 as the rotor wing rotates is such that it does not collide with a lug 362 which extends from mast 46. As the rotor wing slows down, movable finger 360 is urged to the position indicated by dotted line y by means of a spring (not shown), the spring being weak enough to be overcome by the centrifugal force of weight 360b when the rotor wing is rotating normally. When movable finger 360 is in position y, its path is such that it will collide with lug 362. However, as long as the rotor wing continues to rotate in a counterclockwise direction, as viewed in Figure 5 (corresponding to the direction of arrows A in Figure 1), each time movable finger 360 contacts lug 362, movable finger 360 is merely rotated in a counterclockwise direction against the resistance of its spring, without movement of fixed finger 358 and sector gear 354. However, when the normal direction of rotation is reversed just prior to locking of the rotor wing, movable finger 360 will engage lug 362 in such manner as to cause movable finger 360 and pivoted finger 356 to be rotated in a clockwise direction, moving sector gear 354 to the position shown in full lines in Figure 5, raising screws 346 against shoe 350 and leveling the rotor wing. Little force is required for such leveling, for the reason that the rotor wing in changing directions always tends to pass through the horizontal position. This is because the end of the rotor wing which was moving with the forward speed of the plane during normal rotation of the rotor wing moves against the forward speed of the plane during reverse rotation so that the unbalance of lift between the two ends of the rotor wing is reversed.

In converting from fixed- to rotary-wing flight, as the rotor wing commences rotation, pivoted finger 356 engages lug 362, rotating sector gear 354 to the position shown in dotted lines in Figure 5 and lowering screws 346 from shoe 350 to free the rotor wing for oscillation.

The rotor wing is fixed in proper position for fixed-wing flight by means of a mechanism indicated generally at 364 in Figure 5 and shown in greater detail in Figures 10 and 10A. This mechanism comprises a pair of pawls 366 and 368 each of which is pivotally connected to a lever 370 at 366a and 368a respectively. Lever 370 is pivoted at 370a to a platform 372 extending from the mast 46. Each of the pawls 366 and 368 is mounted on the platform and each has an opening, 366b and 368b respectively, which engages a stud, 372a and 372b respectively to form a movable pivot for the pawl on the platform 372. Pawls 366 and 368 are respectively adapted to cooperate with slots 374a and 374b in a ring 374 which is mounted on and rotates with the rotor wing center section 34a. In rotary-wing flight the pawls 366 and 368 are normally in the position shown in Figure 10A where each is out of the path of its slot, 374a and 374b respectively.

When it is desired to actuate the fixer mechanism, pawl 366 is rotated in a clockwise direction as viewed in the drawings by means of an arm 366c extending from pawl 366. A pair of springs 376 and 378 are connected between arm 366c and a pair of fingers 380 and 382 (Figure 5) respectively to form a toggle. Each of fingers 380 and 382 has at its outer end a flipper, 380a and 382a respectively. During normal rotary-wing flight the toggle assembly is in such position that the flipper 380a on finger 380 is out of the path of a lug 384 on the ring 374. In such position of the toggle, flipper 382a is in the path of lug 384 and is engaged by lug 384 each revolution of the rotor wing. However, flipper 382a is adapted to be merely pressed out of the way by lug 384 without movement of the toggle assembly.

When the rotor wing reverses immediately prior to fixing of the rotor wing, lug 384 engages flipper 382a in a reverse direction, rotating the toggle assembly clockwise as viewed in Figure 5, and moving pawl 366 clockwise as viewed in Figure 10. This causes pawl 366 to move so that stud 372a relatively moves from the position shown in Figure 10A to that shown in dotted lines in Figure 10. Lug 384 is so positioned that this movement of pawl 366 occurs some 10 or 15 degrees of rotation of the rotor wing prior to the point at which pawl 366 engages a dog 385 pivotally positioned at the end of slot 374a. When this happens, pawl 366 is first pushed inwardly so that the relative position of lug 372a is as shown in full lines in Figure 10. As the rotor wing continues to rotate a very slight distance, pawl 366 is rotated clockwise, as viewed in Figure 10, about stud 372a as a pivot. As pawl 366 rotates, dog 385 rotates with it and remains at all times flush with the end of pawl 366. This rotation of pawl 366 involves an upward movement of the portion 366a of pawl 366 which adjoins lever 370, producing a clockwise movement of lever 370 about its pivot 370a. This in turn causes a counterclockwise movement of pawl 368 about stud 372b. Also, since the point 368a at which lever 370 adjoins pawl 368 is moved arcuately about the pivot 370a of lever 370 and has a component of motion in the direction of stud 372b, pawl 368 is not only rotated but is moved longitudinally as can be seen from a comparison of its positions relative to stud 372b in Figures 10A and 10. Thus pawl 368 is rotated for engagement with its slot 374b and is moved longitudinally to follow up the movement of the end of the slot as the rotor wing continues to rotate during the rotation of pawl 368, so that the rotor wing is brought to rest with both pawls 366 and 368 seated without play in the ends of their respective slots 374a and 374b.

The fixer mechanism is unlocked by counterclockwise rotation of lever 370. This causes pawl 368 to move to the position shown in Figure 10A, and allows commencement of rotation of the rotor wing in the normal direction (in accordance with arrows A, Figure 1). It also causes pawl 366 to be moved longitudinally so that stud 372 occupies the relative position indicated by dotted lines in Figure 10. On the first rotation of the rotor wing, lug 384 (Figure 5) engages flipper 380a on finger 380 rotating finger 380 counterclockwise, as viewed in Figure 5, which in turn causes pawl 366 to move counterclockwise to the position shown in Figure 10A. In such position the fixer mechanism allows free rotation of the rotor wing.

A spring 387 (Figure 5) is compressed between the outer end of the toggle assembly and the outer race 128 of ball bearing 85; this biases the toggle assembly toward either of its extreme positions, and serves to retain the assembly in the position to which it is moved by lug 384.

Movement of lever 370 in a counterclockwise direction for unlocking of the fixed mechanism is accomplished in the following manner: A slotted lever 470 (Figure 2) is pivotally mounted at 470a and engages a pin 264a on the shaft 264 which extends rearwardly from conversion control handle 256. Slotted lever 470 is shaped with its forward portion parallel with shaft 264 and its after portion inclined with respect thereto so that movement of conversion control handle between positions a and b (Figure 11) produces no movement of lever 470; whereas movement of lever 256 from position b to position c causes levers 470 to be rotated in a clockwise direction, as viewed in Figure 2. A shaft 474 is attached to the after end of lever 470 through a link 472 so that clockwise rotation of lever 470 causes link 472 and shaft 474 to be pulled downwardly. Shaft 474 extends upwardly through the mast fairing and its upper end is attached near one end of a lever 476 (Figure 5) which is centrally pivoted and whose opposite end is formed in a fork 476a which embraces a flange 370a at one end of lever 370. As shaft 474 is pulled downwardly, lever 476 is rotated about its pivot. The resulting movement of fork 476a has a component which is to the left, as viewed in Figure 5, and therefore causes lever 370 to be rotated in a counterclockwise direction, as viewed in that figure. The fixer mechanism on the opposite side of the masthead is similarly actuated for unlocking, its lever 476 being connected to the lever 476 of the other fixer mechanism through a centrally pivoted lever 478. As shaft 474 is pulled downwardly, lever 478, which is attached near the same end of lever 476 as is shaft 474, is rotated so that its lower end, as viewed in Figure 5, moves downwardly and its upper end moves upwardly. This rotates lever 475 of the upper fixer mechanism so that its lever 370 is rotated in a counterclockwise direction.

Since the upper wing of the aircraft is subjected to considerable forces during fixed-wing flight, auxiliary locking means for holding the rotor wing in its proper rotational position, in addition to fixer mechanism 364, are provided in the present aircraft. To this end, a locking pin 386 is mounted at either side of the mast 46 and is adapted to extend into recesses in the end portions 34b of the rotor wing. Locking pins 386 are mounted for axial reciprocation in roller bearings 388 (Figure 4) and are adapted to be moved by levers 390 which are attached at one end to locking pins 386 and at the opposite end to links 392 which are connected to one end of bell cranks 394 whose opposite ends are connected to a rod 396 extending upwardly through the mast housing. The lower end of rod 396 is connected by means of link 398 (Figure 2) to one end of a slotted crank 400 which is pivoted to the frame of the aircraft at 400a and which embraces a pin 402 extending from arm 404 secured to rod 264 which extends from conversion control handle 256. The conformation of slotted crank 400 is such that when conversion control handle 256 is moved between positions a and b of opening 260a of guide 260 (Figure 11), finger 402 engages an inclined portion of slotted crank 400, rotating crank 400, reciprocating link 398 and rod 396, rotating bell cranks 394, reciprocating links 392 and rotating levers 390 to engage or disengage locking pins 386.

Movement of locking pins 386 to the position for locking the rotor wing against rotation performs the additional function of releasing mechanism for closing the flaps 326 and 328. It will be recalled that flaps 326 and 328 are held in the open position against the reaction of springs 332 by virtue of engagement of flap control rod 334 (Figure 6) by a latch 342. This latch 342 is pivoted to the frame of end portion 34b of the rotor wing at 342a (see Figure 5); one end of latch 342 engages notch 334a on the underside of the inner end of flap control rod 334. The opposite end of latch 342 is positioned in the path of locking pin 386 so that locking pin 386, in moving to the locking position, engages a beveled portion on the underside of latch 342, rotating latch 342 to disengage its opposite end from notch 334a and freeing flap control rod 334 for movement.

It can be seen from a comparison of Figures 9 and 9A that in going from the fully open to the fully closed position, a slight extension of spring 332 is necessitated. Accordingly, the flaps may not be fully closed by the springs. The flaps on one side of the aircraft will tend to be closed by air pressure against them but this air pressure will tend to keep the flaps on the opposite end of the wing open. Accordingly, flap control rod 334 must be actuated to close the flaps. This is accomplished by means of lever 406 (Figure 5) one end of which is pivoted to the frame of the end portion of the rotor wing at 406a and the other end of which is pivoted near the inner end of the flap control rod 334 at 406b. Lever 406 is positioned in the path of locking pin 386 so that movement of the locking pin to the locking position rotates lever 406 clockwise, as shown in Figure 5, pushing rod 334 and rotating levers 330 to the position shown in Figure 9A. In such position of each of levers 330, its ball 330b is forward of the axis 326a of flaps 326 so that the force of spring 332 now is applied to maintain the flaps in closed position.

Electric motor 164 (Figure 13) which is used for directional control of the aircraft in rotary-wing flight, as above described, is also used for the purpose of driving the compressor turbine or other propeller drive for starting thereof at the commencement of a flight, and of driving the rotor wing for starting thereof when converting from airplane to autogiro flight. This triple function is accommodated by the mechanism shown in Figure 13. Electric motor 164 is connected through an over-running clutch 408 to drive plate 410 from the upper side of which project three equally spaced pins 412 on each of which is rotatably mounted a planetary gear 414 which meshes with a central gear 416 and with a ring gear 418. Central gear 416 is secured on the same shaft 420 as another gear 422 which meshes with a larger gear 424 which is secured to the lower end of drive shaft 48. Ring gear 418 is rotatably supported on shaft 420 by means of ball bearings 426; an external bevel gear 418a is formed on ring gear 418 and this bevel gear meshes with another bevel gear 428 which is coupled through an over-running clutch 430 to the compressor turbine of the turbo-jet engine which drives propeller 20 (Figure 1) and which also, in the present embodiment, supplies compressed air to rotor wing jets 222 (Figure 1).

It can be seen that when ring gear 418 is held in position, rotation of electric motor 164, and of plate 410 and planetary gears 414 thereby, will drive central gear 416, shaft 420, gears 422 and 424 and drive shaft 48 to rotate the rotor wing for starting thereof, or for directional control. On the other hand, when central gear 416 is held in position, rotation of motor 164, plate 410 and gears 414 will drive ring gear 418, bevel gears 418a and 428 and the compressor turbine for starting thereof. For fixing either central gear 416 or ring gear 418, there is provided a pair of band brakes 432 and 434, the former operative upon ring gear 418 and the latter upon a drum 436 keyed to shaft 420. Band brakes 432 and 434 are connected through links 438 and 439 respectively to a yoke 440 which is pivoted at 440a. Rotation of yoke 440 in a clockwise direction, as shown at Figure 13, tightens band brake 432 and relaxes band brake 434 to fix ring gear 418 and release central gear 416, so that rotation of electric motor 164 will drive the rotor wing. Rotation of yoke 440 in a counterclockwise direction will tighten band brake 434 and relax band brake 432 to fix central gear 416 and release ring gear 418 so that electric motor 164 will drive the compressor turbine. Yoke 440 is normally held in a clockwise position by spring 442 so that normally electric motor 164 is coupled to drive the rotor wing. Yoke 440 may be rotated in a counterclockwise direction from such position by means of a cable 444 attached thereto, cable 444 passing over a pulley 446 (Figure 2) and attached to one end of bell crank 448 whose opposite end is attached to the lower end of foot pedal 450 so that depression of foot pedal 450 rotates bell crank 448 to pull cable 444 and rotate yoke 440 counterclockwise to decouple electric motor 164 from the rotor wing and couple it to the compressor turbine. An electric switch (not shown) is also associated with foot pedal 450 so that depression of foot pedal 450 applies electrical power to electric motor 164 for rotation thereof.

Electrical power may also be supplied to motor 164 by means of a rheostat 162 (Figure 2) associated with the directional control mechanisms, as above described, and by a switch 452 (Figure 14) which is actuated when it is desired to rotate the rotor wing for starting thereof in the following manner. In autogiro flight, it is necessary to drive the rotor wing until it reaches a certain critical speed, upon which it becomes autorotative. In the present aircraft, means are provided for closing switch 452 for supplying power to motor 164 to drive the rotor wing, when converting from airplane to autogiro flight, and for automatically opening switch 452 at such time thereafter as the rotor wing will have reached critical autorotative speed. As shown in Figure 14, armature 452a of switch 452 is normally urged to the off position of the switch by means of spring 454. A pin 452b on armature 452a is adapted to cooperate with a flipper lug 456 on rod 264 which extends from the stub shaft 262 associated with conversion control handle 256. Flipper lug 456 is so arranged that it will actuate armature 452 when rod 264 is moved to the right, as shown in Figure 14, but not when rod 254 is moved in the opposite direction, and is placed so that it will engage pin 452b and actuate armature 452a to close switch 452 when conversion control handle 256 is moved from position b to position c (Figure 11). This movement of armature 452a produces a movement to the right, as shown in Figure 14, of a piston 458 which reciprocates within a cylinder 460 and whose rod 458a is attached to armature 452a by means of link 462. As piston 458 moves to the right in cylinder 460; air is drawn in to the lefthand end of cylinder 460 behind piston 458 through a fixed orifice 460a and through a check valve 460b, and is expelled from the righthand end of cylinder 460 ahead of the moving piston 458 through fixed orifices 460c. The extent of movement of rod 264 by conversion control handle 256 is such that flipper lug 456 completely passes pin 452b and releases armature 452a. Spring 454 tends to return armature 452a to the off position. Such movement, however, is slowed by the rate of expulsion of air through fixed orifice 460a as piston 458 is moved leftward, check valve 460b being closed during such movement of piston 458. Fixed orifice 460a is so proportioned that the return of piston 458, and the opening of switch 452 is delayed for a length of time sufficient for motor 164 to bring the rotor wing up to critical autorotative speed.

Alternatively, the armature 452a of switch 452 may be operatively connected to a governor 227 (Figure 14) so that the switch is operated to shut off the supply of electrical power to motor 164 when the rotor wing reaches critical autorotative speed.

The operation of the aircraft is as follows: To start the compressor turbine, the pilot depresses foot pedal 450; this shifts the tension from band brake 438 to band brake 440 to couple electric motor 164 to the compressor turbine and closes a switch to apply power to the motor. Foot pedal 450 is held down until the turbine pressure increases to such value as will cause the compressor turbine combustion chambers to fire. When the compressor turbine combustion chambers fire, the compressor turbine accelerates to a velocity greater than that to which electric motor 164 tends to drive it, so that the over-running clutch 430 renders motor 164 ineffective to drive the compressor turbine further.

Assuming that it is desired to take off as helicopter, conversion control handle 256 is placed in its rearmost position, g of Figure 11. In such position, switch 266 and valves 270 and 268 (Figure 12) respectively are set so that ignition, compressed air and fuel are supplied to the rotor wing jets 222. Rotor wing 34 will accordingly be driven at a speed which is determined by the throttle setting, as controlled by foot pedal 226. When it is desired to take to the air, vertical control handle 168 is raised. This increases the angle of attack of the end portions 34b of the rotor wing and, accordingly, the aerodynamic lift of the rotor wing. Movement of control handle 168 also shifts the throttle setting to supply greater power to rotor wing jets 222.

While flying as a helicopter, the movement of the aircraft may be controlled by means of control wheels 44 and vertical control handle 168. Movement of control wheels 44 longitudinally of the aircraft varies the setting of ailerons 40 at fore-and-aft positions of the rotor wing to vary the aerodynamic lift of the two end portions of the rotor wing at such positions and tilt the plane of rotation of the rotor wing about a transverse axis. Rotation of control handles 44 about their axes varies the setting of ailerons 40 at athwartships positions of the rotor wing to tilt its plane of rotation about a longitudinal axis. Thus, the general direction of movement of the aircraft can be controlled.

Movement of control handle 44 bodily in one direction applies the band brake 158 to cause the fuselage of the aircraft to turn in the same direction as the rotor wing, and movement of control wheels 44 in the opposite direction moves rheostat 162, applying or increasing power to motor 164 (Figure 13) which, since yoke 440 is in its normal clockwise position, as shown in Figure 14, is coupled to the rotor wing to increase the rotary force acting thereupon; since motor 164 reacts against the fuselage this causes turning of the fuselage in a direction opposite to that in which the rotor wing is rotating. Thus the heading of the fuselage may be controlled.

Movement of vertical control handle 168 varies the angle of attack of the two end portions 34b of the rotor wing equally to vary the over-all aerodynamic lift of the rotor wing and cause the aircraft to gain or lose altitude as desired. Movements of vertical control handle 168 also vary the throttle setting to accommodate variations in drag of the rotor wing.

When sufficient altitude has been attained and/or when it is desired to convert to autogiro flight, conversion control handle 256 is moved to position c (Figure 11) in steps through the various intermediate positions. Movement of control handle 256 to position f varies the settings of switch 266 and valves 268 and 270 (Figure 12) first to supply ignition to the combustion chambers of the turbine which drives propeller 20, and then to shunt part of the compressed air of the compressor and part of the fuel from the rotor wing jets to such combustion chambers. This will cause the propeller turbine combustion chambers to light and supply some power to propeller 20, and afford the pilot opportunity to verify proper functioning of the mechanism associated therewith. Movement of conversion control handle 256 to position e completes the transfer of power from the rotor wing jets to the propeller. The propeller will thus now operate at full power and the plane will increase speed to autogiro cruising speed. Since the rotor wing is already rotating at above the critical autorotative speed it will continue to rotate as the aircraft moves forward.

Movement of conversion control handle 256 to position d brings both levers 272 and 274 into engagement with the undersurface of portable control handle 168, effectively locking vertical control handle 168 in position at that setting which will afford optimum angle of attack of the end portions 34b of the rotor wing for autogiro flight. The aircraft is now flying as an autogiro with cyclical and directional controls in addition to the conventional autogiro controls. These added controls offer certain advantages for pilots skilled enough to avail themselves thereof.

Movement of conversion control handle 256 to position c actuates the pickup mechanisms 152 (Figure 2) and 284 (Figure 6) to neutralize and drop the cyclical (aileron) and directional controls. The aircraft is now in conventional autogiro flight.

When it is desired to convert to airplane flight, control handle 256 is moved to position a (Figure 11) in steps through the various intermediate positions. Movement of control handle 256 to position b will cause the forward lever 272 to clear the undersurface of vertical control handle 168 and the after lever 274 to move the after end of control handle 168 upwardly to align the end portions 34b of the rotor wings (zero angle of attack). As the end portions 34b of the rotor wing are aligned with the center portion 34a, lug 308 (Figure 7) engages crank arm 306 to cause movement of the pickup mechanism 284 (Figure 6) to the position for removing control of ailerons 40. Rotation of the levers 210 (Figure 5) over the straight portion 220a (Figure 5a) of their tracks 220 produces no change in angle of attack of the end portions 34b of the rotor wing, but it does cause lever 210 to engage lever 340 (see also Figure 6) releasing the flaps to retard the rotor wing. Slowing of the rotor wing allows aileron locking members 310 to engage and lock ailerons 40 against movement. As the rotor wing slows down, movable finger 360 (Figure 5) is moved by spring pressure against the lessened centrifugal force of weight 360b to position y where it engages lock 362 each revolution. After the rotor wing is reversed by action of the flaps 326 and 328, movable finger 360 engages lug 362 to raise jacks 346 and level the rotor wing.

On the first fractional revolution of the rotor wing in the reverse direction, lug 384 (Figure 5) engages flipper 382a, which causes shifting of pawl 366 to position for engagement in slot 374a (Figures 10 and 10a). Immediately thereafter, pawl 366 engages slot 374a and is rotated thereby to cause movement of pawl 368 in slot 374b, locking the rotor wing against movement in either direction.

Movement of control handle 256 to position a causes locking pins 386 (Figure 5) to engage the rotor wing and double-lock it against rotation. Engagement of locking pins 386 with levers 406 also serves to close flaps 326, 328.

The aircraft is now flying as an airplane.

Conversion from airplane flight to autogiro and helicopter flight is accomplished in the same manner as is the conversion just described with the following differences: In converting from airplane to autogiro flight, as conversion control handle 256 is moved between positions b and c (Figure 11) the rod 387 is actuated to unlock the fixed mechanism 385 (Figures 5 and 10). This movement of control handle 256 also closes switch 452 to actuate motor 164 for driving the rotor wing to critical autorotative speed, after which cylinder 460 cuts off the supply of power to motor 164.

There will thus be seen to have been provided an aircraft which combines the advantageous features of several types of flight and by which the aforementioned and other desirable objects have been achieved.

I claim:

1. In an aircraft of the type convertible to fixed- or rotary-wing flight and having a central wing portion and end wing portions variable in angle of attack, means for vertical control of said aircraft in rotary-wing operation, said means including an inclined guide surface on each of said end wing portions, a fixed guide surface mounted on said central wing portion and adapted to cooperate with said inclined guide surface, a lever mounted on said central wing portion for movement substantially parallel to the chord axis thereof and to operatively connect said guide surfaces, and a control handle operatively connected to said lever, whereby movement of said control handle moves said lever substantially parallel to said chord axis to move said inclined surface vertically relative to said chord axis.

2. In an aircraft of the type convertible to fixed- or rotary-wing flight and having a central wing portion fixed in angle of attack and end portions variable in angle of attack, means for vertical control of said aircraft in rotary-wing operation, said means including an inclined arcuate track on each of said end portions, a lever pivoted on said central wing portion for rotation in a plane substantially parallel to the chord axis of said central wing portion but fixed against vertical movement, a pair of rollers on said lever and embracing said track, and a control handle operatively connected to said lever, whereby movement of said handle causes rotation of said lever and rollers in a plane substantially parallel to the plane of said central wing portion and vertical movement of said arcuate track and said end wing portion relative to said plane of said central wing portion.

3. In an aircraft of the type convertible to fixed- or rotary-wing flight and having a central wing portion fixed in angle of attack and end portions variable in angle of attack, means for vertical control of said aircraft in rotary-wing operation, said means including an inclined arcuate track on each of said end portions and a level arcuate track on said central wing portion adjacent said inclined arcuate track and concentric therewith, a lever pivoted for rotation on said central wing portion in a plane substantially parallel to the plane of said central wing portion, two pairs of rollers on said lever, each said pair embracing one of said tracks, and a control handle operatively connected to said lever, whereby movement of said handle causes rotation of said lever and rollers in a plane substantially parallel to the plane of said central portion and vertical movement of said inclined arcuate track and said end wing portion relative to the plane of said central wing portion.

4. The combination as claimed in claim 2 wherein a portion of said track adjacent one end thereof is level, whereby further movement of said handle produces no vertical movement of said wing portion.

5. In an aircraft of the type convertible to fixed- or rotary-wing flight and having ailerons on the wing of said aircraft for cyclical control in rotary-wing flight, means for automatically locking said ailerons in neutral position in fixed-wing flight and unlocking said ailerons in rotary-wing flight comprising a weighted bolt pivotally mounted on the wing of said aircraft adjacent said aileron, a bolt-receiving member, and a spring connected between said bolt and said aircraft wing to normally urge said bolt into said bolt-receiving member fixed in said aileron to lock said ailerons, said bolt being adapted to be moved by centrifugal force, when said wing is rotating, out of said bolt-receiving member to unlock said ailerons.

6. In a rotary-wing aircraft of the type having an aileron pivotally mounted on its wing and a control rod extending longitudinally of said wing and operatively connected to said aileron for moving said aileron, means for overcoming the centrifugal force of said control rod when said wing is rotating and for balancing said wing against longitudinal displacement of said control rod comprising a weight, and a centrally pivoted lever connected at one end to said weight and at the other end to said rod, whereby longitudinal movement of said weight produces movement in the opposite direction of said control rod, and vice versa.

7. In a rotary-wing aircraft a rotatable wing, means for cyclical control thereof including a manual control, a non-rotary ring at the center of rotation of said wing mounted for pivotal movement in a plurality of planes and operatively connected with said manual control, whereby said ring may be tilted about at least two mutually perpendicular diameters in accordance with the movements of said manual control, a rotary ring concentric with said non-rotary ring and operatively connected for rotation with said wing and for tilting with said non-rotary ring, a supporting arch member pivotally mounted about a diameter of said rotary ring, guide means restricting said supporting arch member against rotational movement about the longitudinal axis of said wing while admitting movement in a plane substantially perpendicular to the plane of the center section of said wing and parallel to said axis, and control surfaces on said wing operatively connected to said supporting arch member, whereby movement of said supporting arch member causes deflection of said control surfaces.

8. In an aircraft of the type convertible to fixed- or rotary-wing flight having a rotor blade with blade portions rotatable relative to each other about longitudinal axes parallel to the longitudinal axis of said rotor blade and a flight control member operative in both of such types of flight, means for selectively rendering said control member operative and inoperative to actuate a control surface of said aircraft, comprising a first shaft operatively connected to said flight control member, an arcuate guide pivotally attached at one end to said first shaft and at the other end to a frame portion of said aircraft, a radial link with one end slidably engaging said guide and the other end pivotally attached to a second shaft operatively connected to said control surface, a bearing securing said second shaft for axial movement only, and a second control member operatively connected to rotate said radial link while allowing free axial movement thereof.

9. In a rotary-wing aircraft, having means for cyclical control and ailerons mounted on said wing, means for causing said ailerons to balance their forces with their respective wing portions comprising a floating beam mounted for pivotal and translational movement and operatively connected to said ailerons, and a manual control operatively connected to said floating beam whereby said ailerons are deflected at various points in the rotation of said wing in accordance with the position of said manual control.

10. In an aircraft of the type convertible to fixed or rotary wing flight and having similar control surfaces on opposite sides of the aircraft, means for equalizing forces applied to said control surfaces, said means comprising a manual control, a centrally pivoted beam mounted in a plane substantially parallel to said surfaces and operatively connected to said manual control, a pair of linkages positioned for movement along axes parallel to the longitudinal axis of said rotary wing operatively connecting each end of said beam with one of said similar control surfaces, whereby movement of said manual control produces translational movement of said beam, said movement of said beam producing deflection of said control surfaces.

11. In an aircraft of the type convertible to fixed or rotary wing flight having rotor blades, means for lateral control comprising a centrally pivoted beam, a manual control operatively connected to the pivot point of said beam, ailerons on opposite blades thereof, said ailerons being operatively connected with opposite ends of said beam, whereby movement of said manual control produces lateral translational movement of said pivot point and lateral movement of said ends produces deflection of said ailerons, and vice versa.

12. In an aircraft of convertible type having a rotatable wing and means for cyclical control thereof including a manual control the combination of, a pivotally mounted non-rotary ring at the center of rotation of said wing operatively connected with said manual control, whereby said ring may be tilted about a pair of mutually perpendicular diameters in accordance with the movements of said manual control, a rotary ring concentric with said non-rotary ring and operatively connected for rotation with said wing and for tilting with said non-rotary ring, a floating beam mounted for translational and pivotal movement, support means for said beam operatively connected thereto and pivoted with respect to said rotary ring, guide means restricting said support means against rotational movement about the longitudinal axis of said wing while admitting movement in a plane substantially perpendicular to the plane of the center section of said wing and parallel to said axis, and control surfaces on said wing operatively connected to said beam whereby movement of said support means causes deflection of said control surfaces.

13. Apparatus as described in claim 8 wherein said second control member is actuated by the aligning of said rotatable blades.

14. In an aircraft of the type convertible to fixed or rotary wing flight and having a central wing portion and end wing portions variable in angle of attack relative thereto, control means for varying said angle of attack including an inclined guide surface on each of said end wing portions, a fixed guide surface mounted on said central wing portion, a lever pivotally mounted on said central wing portion for movement substantially parallel to the chord axis and positioned to engage both said guide surfaces, a control handle operatively connected to said lever, whereby movement of said handle moves said lever substantially parallel to said chord axis to move said inclined surface vertically relative to said chord axis and said fixed guide, a non-rotary ring at the center of rotation of said wing operatively connected with said control handle, and mounted for pivotal movement about a diameter thereof in accordance with the movement of said control handle; a rotary ring concentric with and operatively connected to said non-rotary ring and adapted for rotation with said wing and for tilting with said non-rotary ring and ailerons pivotally mounted on said end wing portions operatively connected to said rotary ring whereby the angle of attack of said end wing portions may be controlled cyclically and collectively by a single control handle.

(References on following page)

References Cited in the file of this patent

UNITED STATES PATENTS

| Number | Name | Date |
|---|---|---|
| 1,485,704 | Pescara | Mar. 4, 1924 |
| 1,543,566 | Harris et al. | June 23, 1925 |
| 1,589,658 | Pescara | June 22, 1926 |
| 1,673,232 | Cierva | June 12, 1928 |
| 1,999,737 | Pecker | Apr. 30, 1935 |
| 2,023,760 | Dornier | Dec. 10, 1935 |
| 2,045,623 | Wilford | June 30, 1936 |
| 2,055,585 | Perrin | Sept. 29, 1936 |
| 2,087,245 | De Port | July 20, 1937 |
| 2,232,289 | Upson | Feb. 18, 1941 |
| 2,269,833 | Upton | Jan. 13, 1942 |
| 2,303,295 | Allen | Nov. 24, 1942 |
| 2,352,404 | Pitcairn | June 27, 1944 |
| 2,372,481 | Gagas | Mar. 27, 1945 |
| 2,402,001 | Zap | June 11, 1946 |
| 2,415,148 | Sikorsky | Feb. 4, 1947 |
| 2,428,200 | Campbell | Sept. 30, 1947 |
| 2,443,393 | Landgraf | June 15, 1948 |
| 2,445,973 | Sawyer | July 27, 1948 |
| 2,479,125 | Leonard | Aug. 16, 1949 |
| 2,512,461 | Jenny | June 20, 1950 |
| 2,530,276 | Weir | Nov. 14, 1950 |

FOREIGN PATENTS

| Number | Country | Date |
|---|---|---|
| 578,710 | Great Britain | July 9, 1946 |